United States Patent
Asano

(10) Patent No.: US 7,457,292 B2
(45) Date of Patent: Nov. 25, 2008

(54) PACKET IDENTIFICATION DEVICE AND PACKET IDENTIFICATION METHOD

(75) Inventor: Kazuya Asano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 515 days.

(21) Appl. No.: 11/082,798

(22) Filed: Mar. 18, 2005

(65) Prior Publication Data

US 2005/0163121 A1 Jul. 28, 2005

Related U.S. Application Data

(63) Continuation of application No. PCT/JP03/000863, filed on Jan. 29, 2003.

(51) Int. Cl.
*H04L 12/28* (2006.01)
(52) U.S. Cl. .................... 370/392; 370/401; 726/13
(58) Field of Classification Search ............... 370/252, 370/253, 389, 392, 401, 412; 711/216; 726/13
See application file for complete search history.

(56) References Cited

U.S. PATENT DOCUMENTS

| | | | |
|---|---|---|---|
| 6,490,279 B1 * | 12/2002 | Chen et al. ................ | 370/392 |
| 7,012,890 B2 | 3/2006 | Yazaki et al. | |
| 2002/0067722 A1 * | 6/2002 | Kanakubo ................ | 370/389 |
| 2002/0191598 A1 * | 12/2002 | Mays ....................... | 370/389 |
| 2003/0223421 A1 * | 12/2003 | Rich et al. ................ | 370/392 |

FOREIGN PATENT DOCUMENTS

| | | |
|---|---|---|
| JP | 11-164271 | 6/1999 |
| JP | 11-305992 | 11/1999 |
| JP | 2000-92110 | 3/2000 |
| JP | 2002-247032 | 8/2002 |
| JP | 2003-18198 | 1/2003 |
| WO | WO 99/00750 | 1/1999 |
| WO | WO 2004/068804 | 8/2004 |

OTHER PUBLICATIONS

Patent Abstracts of Japan, Publication No. 04-109337, Published Apr. 10, 1992.

(Continued)

*Primary Examiner*—Ricky Ngo
*Assistant Examiner*—Pao Sinkantarakorn
(74) *Attorney, Agent, or Firm*—Staas & Halsey LLP

(57) ABSTRACT

A packet identification device which is capable of achieving high-speed packet identification while suppressing an increase in circuit size. A lookup table stores a plurality of reference data each divided into unit data associated with respective attributes, in a distributed manner in respective storage areas having addresses defined on an attribute-by-attribute basis, and is operable when a reading address is input, to output a plurality of unit data associated with one of the attributes corresponding to the reading address. An analysis circuit analyzes an attribute of a comparison data item in the input packet. An address control circuit outputs an address corresponding to the attribute of the comparison data item analyzed by the analysis circuit to the lookup table, as the reading address. A plurality of unit comparison circuits are provided in association with the plurality of reference data, respectively, for each performing comparison between an associated one of the plurality of unit data output from the lookup table and the comparison data item analyzed by the analysis circuit.

10 Claims, 21 Drawing Sheets

OTHER PUBLICATIONS

Patent Abstracts of Japan, Publication No. 07-143156, Published Jun. 2, 1995.
Patent Abstracts of Japan, Publication No. 11-305992, Published Nov. 5, 1999.
Patent Abstracts of Japan, Publication No. 2000-092110, Published Mar. 31, 2000.
Patent Abstracts of Japan, Publication No. 2002-335275, Published Nov. 22, 2002.
Patent Abstracts of Japan, Publication No. 2003-018198, Published Jan. 17, 2003.
Int'l Search Report dated May 20, 2003 in priority PCT/JP03/00863.
Japanese Office Action issued on Aug. 22, 2006 in corresponding Japanese Patent Application No. 2004-567524.
Japanese Office Action issued May 8, 2007 in corresponding Japanese Patent Application No. 2004-567524. The references cited in this Office Action are the same as those already of record.

* cited by examiner

111 LOOKUP TABLE

| SAID | Valid | Src-IP | Dst-IP | SPI | Control |
|---|---|---|---|---|---|
| 0 | 1 | IP.Router-B | IP.Router-A | 5 | 00 |
| 1 | 1 | IP.Router-B | (Don't Care) | 6 | 10 |
| . | . | . | . | . | . |
| . | . | . | . | . | . |
| n | 0 | ... | ... | ... | ... |

FIG. 5

133a SA TABLE

| SAID | Valid | DECODE_KEY | DES/3DES |
|---|---|---|---|
| 0 | 1 | KEY1 | 0 |
| 1 | 1 | KEY2 | 1 |
| . | . | . | . |
| . | . | . | . |
| n | 0 | ... | ... |

FIG. 6

111a REFERENCE DATA

| ADDRESS | REGISTERED CONTENTS |
|---|---|
| 0 | REFERENCE DATA<br>Bit0: → 1: VALID or 2: INVALID |
| 1 | SOURCE IP ADDRESS<br>Bit0: →1: COMPARISON or 0: UNNECESSARY<br>Bit[5:1]: SUBNET MASK LENGTH -1 |
| 2 | FIRST BYTE OF SOURCE IP ADDRESS |
| 3 | SECOND BYTE OF SOURCE IP ADDRESS |
| 4 | THIRD BYTE OF SOURCE IP ADDRESS |
| 5 | LAST BYTE OF SOURCE IP ADDRESS |
| 6 | DESTINATION IP ADDRESS<br>Bit0: →1: COMPARISON or 0: UNNECESSARY<br>Bit[5:1]: SUBNET MASK LENGTH -1 |
| 7 | FIRST BYTE OF DESTINATION IP ADDRESS |
| 8 | SECOND BYTE OF DESTINATION IP ADDRESS |
| 9 | THIRD BYTE OF DESTINATION IP ADDRESS |
| 10 | LAST BYTE OF DESTINATION IP ADDRESS |
| 11 | SPI<br>Bit0: →1: COMPARISON (ALWAYS SET TO 1)<br>Bit[5:1]: FIXED TO 31 |
| 12 | FIRST BYTE OF SPI |
| 13 | SECOND BYTE OF SPI |
| 14 | THIRD BYTE OF SPI |
| 15 | LAST BYTE OF SPI |
| 16 | SA ID |

FIG. 9

910 LOOKUP TABLE

| SAID | Src IP ADDRESS | Dst IP ADDRESS | SPI |
|---|---|---|---|
| 0 | IP.PC-A | IP.PC-B | 5 |
| 1 | IP.PC-A | Don't Care | 6 |
| ⋮ | ⋮ | ⋮ | ⋮ |

FIG. 20
PRIOR ART

PACKET IDENTIFICATION DEVICE AND PACKET IDENTIFICATION METHOD

This application is a continuing application, filed under 35 U.S.C. §111(a), of International Application PCT/JP2003/000863, filed Jan. 29, 2003.

BACKGROUND OF THE INVENTION

1. Field of the Invention

This invention relates to a packet identification device and a packet identification method for identifying the contents of a packet, and more particularly to a packet identification device and a packet identification method that identify a packet by comparison with data registered in advance.

2. Description of the Related Art

As a basic function of processing packets transferred via an IP (Internet Protocol) network, there has been conventionally known a function of identifying each packet based on an IP address, a TCP (Transmission Control Protocol) port number, or the like. For example, in routing packets using a router, the interface of a next transfer destination is determined based on a destination IP address. Further, in the case of NAT (Network Address Translation), a router performs conversion of an IP address and a port number based on destination and source IP addresses and destination and source TCP port numbers.

Further, when a VPN (Virtual Private Network) device decrypts encrypted packets, a packet identification device of the VPN device compares pre-registered information (hereinafter referred to as the lookup table) with the contents of a packet currently being processed.

FIG. 20 is a diagram showing an example of the data structure of a conventional lookup table. In the lookup table 910, there are registered SA IDs, Src IP addresses, Dst IP addresses, and SPIs (Security Parameter Indexes). It should be noted that SA ID represents an identifier of an SA (Security Association), Src IP address represents a source IP address, and Dst IP address represents a destination IP address.

The packet identification device performs comparison between records of the lookup table 910 configured as above and a set of pieces of information to be compared (destination IP address, source IP address, and SPI) contained in a packet, and identifies an SA based on the SA ID of a record matching the information. The VPN device selects an appropriate secret key based on the SA and performs decryption.

FIG. 21 is a flowchart of a conventional packet identification process. In the following, the process shown in FIG. 21 will be described in the order of step numbers.

[Step S91] The packet identification device sets a variable i to 0.

[Step S92] The packet identification device determines whether or not an i-th record of the lookup table 910 is valid. If the i-th record is valid, the process proceeds to a step S93, whereas if the i-th record is not valid, the process proceeds to a step S96.

[Step S93] The packet identification device compares the source IP address, destination IP address, and SPI in an ESP header of the i-th record of the lookup table 910 with those of a packet, respectively.

[Step S94] The packet identification device determines, based on the result of the comparison in the step S93, whether there is a match in all the compared data items between the i-th record and the packet. If there is a match in all the compared data items, the process proceeds to a step S95. If there is any mismatch, the process proceeds to the step S96.

[Step S95] The packet identification device outputs information indicative of the match between the i-th record and the packet, followed by terminating the present process.

[Step S96] The packet identification device increments the variable i by 1.

[Step S97] The packet identification device determines whether or not the variable i is larger than the number of records registered in the lookup table 910. If the variable i is larger than the number of the registered records, the process proceeds to a step S98, whereas if the variable i is equal to or smaller than the number of the registered records, the process returns to the step S92.

[Step S98] The packet identification device outputs information indicative of a mismatch between the all the records and the packet, followed by terminating the present process.

As described above, in the prior art, the SA of a received packet is identified by a program sequentially comparing a set of a destination IP address, a source IP address, and an SPI in the ESP header of the received packet with all entries in a lookup table.

Further, in routing packets, a comparison is performed between 32-bit values indicative of respective destination IP addresses. Further, in performing NAT, a comparison is performed between data values each defined by a total of 96 bits which indicate destination and source IP addresses and destination and source TCP port numbers.

It should be noted that in FIG. 21, to search the lookup table, there is employed a simplest method, i.e. to search the lookup table in the order of SA numbers. Besides this method, there are various algorithms for efficient search, but they are no different in that a received packet and only one record of registered data are compared in one comparison process. Therefore, with an increase in the number of registered data, search time is inevitably increased.

The comparison is generally handled by software, and places a heavy load on software processing. Therefore, it is predicted that the processing for the comparison will more often cause a bottleneck in the speed-up of network operation in the future. Further, when IPv6 comes into wide use in which one destination IP address is represented by 128 bits, the amount of data for comparison will dramatically increase, resulting in a further increased load on the software processing.

Data comparison can be handled not only by software but also by hardware (see e.g. Japanese Unexamined Patent Publication (Kokai) No. H04-109337). The hardware capable of data comparison includes a CAM (Content Addressable Memory). The use of a CAM makes it possible to identify each packet at high speed. However, if the amount of data to be stored for comparison is large, it is required to use a large-capacity CAM. The problem here is that the usage of a CAM is complicated, and in addition, an increased number of pins are needed so as to compare the large amount of data in a single operation. For this reason, it is extremely difficult in terms of design to install a large-capacity CAM. Moreover, CAMs are very expensive, and hence for economical reasons, it is often difficult to increase the capacity of CAMs. As is apparent from the above, the idea of increasing the capacity of a CAM is impractical.

It is necessary to compare a large amount of data when executing highly developed packet filtering, packet encryption/decryption, etc. A technique has also been contemplated to enable a router to achieve highly developed packet filtering without increasing the capacity of a CAM.

For example, a CAM has been proposed which is capable of performing high-speed comparison of a plurality of pieces of information (e.g. a MAC address and an IP address) contained in a packet, using a plurality of determination circuits each including a comparison circuit with a masking function (see e.g. Japanese Unexamined Patent Publication (Kokai) No. H 07-143156). In this technique, when data to be compared is input, masking is applied to the contents of a database register according to mask data, and then a comparison is performed between unmasked bits and the corresponding bits of the input data.

Thus, data transfer involving IP address and MAC address comparisons can be performed using a single CAM. For example, filtering is executed using predetermined bits of IP addresses, and when it is determined that a packet is not for the IP address filtering, a MAC address comparison is executed to thereby select the interface of an output destination.

In a CAM of the type disclosed in Japanese Unexamined Patent Publication (Kokai) No. H 04-109337, to avoid an increase in the capacity of the CAM, one of an IP address, a MAC address, and other data items for comparison is stored in a database register. Therefore, when data to be compared (hereinafter referred to as "comparison data") is switched (e.g. from an IP address to a MAC address), rewriting of the database register and a database mask register occurs, which reduces processing speed.

Moreover, according to the invention disclosed in the aforementioned Patent Publication, processing for masking and comparison is carried out in units corresponding to the data length of one entry storable in the database register. Therefore, it is necessary to use comparison circuits or the like capable of comparing bits corresponding to the data width of one entry. In this case, if a database register large enough to store all data items (such as IP addresses, MAC addresses, etc.) for use in comparison is provided, the size of the comparison circuit will be increased, which causes an increase in the manufacturing costs of the CAM.

SUMMARY OF THE INVENTION

The present invention has been made in view of the above described points, and an object thereof is to provide a packet identification device and a packet identification method which are capable of achieving high-speed packet identification while suppressing an increase in the size of circuits.

To attain the above object, in a first aspect of the present invention, there is provided a packet identification device for identifying contents of an input packet. This packet identification device is characterized by comprising a lookup table that stores a plurality of reference data each divided into unit data associated with respective attributes, in a distributed manner in respective storage areas having addresses defined on an attribute-by-attribute basis, and is operable when a reading address is input, to output a plurality of unit data associated with one of the attributes corresponding to the reading address, an analysis circuit that analyzes an attribute of a comparison data item in the input packet, an address control circuit that outputs an address corresponding to the attribute of the comparison data item analyzed by the analysis circuit to the lookup table, as the reading address, and a plurality of unit comparison circuits provided in association with the plurality of reference data, respectively, for each performing comparison between an associated one of the plurality of unit data output from the lookup table and the comparison data item analyzed by the analysis circuit.

To attain the above object, in a second aspect of the present invention, there is provided a packet identification device for identifying contents of an input packet. This packet identification device is characterized by comprising a plurality of packet identification units connected in parallel with each other, each of the packet identification units comprising a lookup table that stores a plurality of reference data each divided into unit data associated with respective attributes, in a distributed manner in respective storage areas having addresses defined on an attribute-by-attribute basis, and is operable when a reading address is input, to output a plurality of unit data associated with one of the attributes corresponding to the reading address, an analysis circuit that analyzes an attribute of a comparison data item in the input packet, an address control circuit that outputs an address corresponding to the attribute of the comparison data item analyzed by the analysis circuit to the lookup table, as the reading address, and a plurality of unit comparison circuits provided in association with the plurality of reference data, respectively, for each performing comparison between an associated one of the plurality of unit data output from the lookup table and the comparison data item analyzed by the analysis circuit.

To attain the above object, in a third aspect of the present invention, there is provided a packet identification method for identifying contents of an input packet. This packet identification method is characterized by comprising the steps of storing, in advance, a plurality of reference data each divided into unit data associated with respective attributes, in a distributed manner in respective storage areas having addresses defined on an attribute-by-attribute basis, analyzing an attribute of a comparison data item in the input packet, fetching a plurality of the unit data from a storage area in the lookup table, the storage area being indicated by an address associated with the analyzed attribute of the comparison data item, and performing parallel comparison between the fetched unit data and the comparison data item using a plurality of unit comparison circuits, to thereby determine whether or not the comparison data item matches any of the fetched unit data.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram showing an example of the data structure of a lookup table;

FIG. 6 is a diagram showing an example of the data structure of an SA table;

FIG. 9 is a diagram showing an example of divided registration of reference data;

FIG. 20 is a diagram showing an example of the data structure of a conventional lookup table.

DESCRIPTION OF THE PREFERRED EMBODIMENTS

The present invention will now be described in detail with reference to the accompanying drawings showing a preferred embodiment thereof.

First, the outline of the invention applied to the embodiment will be described, and then a description will be given of details of the embodiment.

Figure 1:
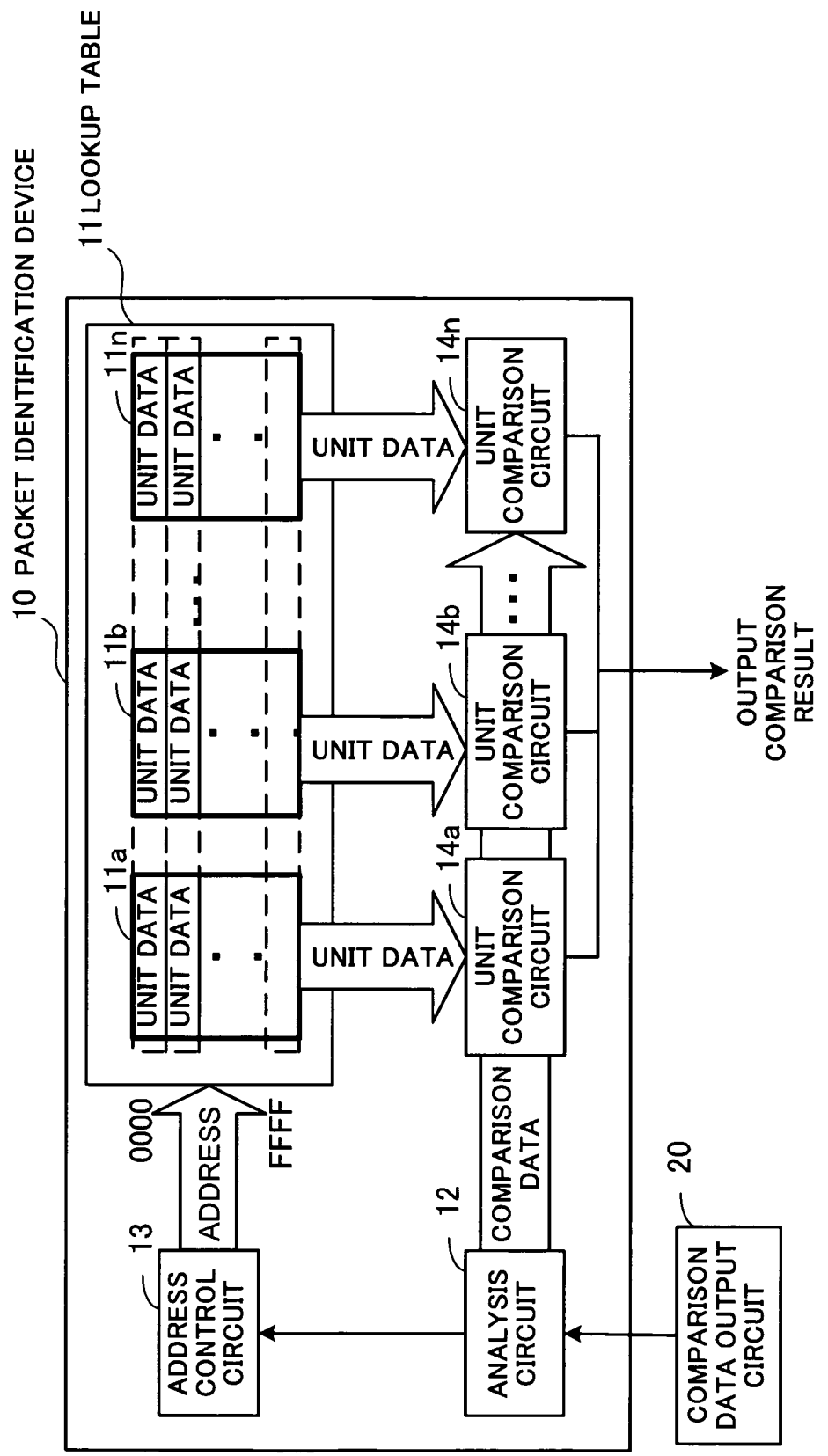
FIG. 1 is a conceptual diagram of the present invention.

FIG. 1 is a conceptual diagram of the present invention. A packet identification device 10 according to the present invention is connected to a comparison data output circuit 20. The comparison data output circuit 20 inputs data of a packet being currently processed to the packet identification device 10 on a unit data-by-unit data basis. For example, the comparison data output circuit 20 inputs packets to be transferred via a router or a VPN device to the packet identification device 10 on a byte-by-byte basis.

The packet identification device 10 simultaneously performs a parallel comparison between comparison data input from the comparison data output circuit 20 and a plurality of pre-registered reference data using the same number of circuits as the number of the registered reference data, which are arranged in parallel with each other. For these comparison operations, the packet identification device 10 is provided with a lookup table 11, an analysis circuit 12, an address control circuit 13, and unit comparison circuits 14a, 14b, . . . , and 14n.

The lookup table 11 stores a plurality of reference data 11a, 11b, . . . , and 11n in a state each divided into a plurality of unit data. When a reading address is input from the address control circuit 13, the lookup table 11 outputs unit data from a storage area corresponding to the address to the unit comparison circuits 14a, 14b . . . , and 14n, respectively.

Unit data constituting a piece of reference data are divided and stored in a distributed manner in respective storage areas each represented by an address associated with an attribute of the data. Unit data constituting the reference data 11a are stored, respectively, in the most significant parts (in FIG. 1, the left-hand side of the lookup table 11 is assumed to be the most significant side, and the right-hand side is assumed to be the least significant side) of the respective storage areas having different addresses. Unit data constituting the reference data 11b are stored in the respective storage areas having different addresses in a manner such that each follows a corresponding one of the unit data constituting the reference data 11a. Unit data constituting the reference data 11n are stored in the least significant parts of the respective storage areas having the different addresses.

The analysis circuit 12 recognizes an attribute (e.g. a protocol on which data is based) of the data to be identified, based on the received comparison data. The analysis circuit 12 informs the address control circuit 13 of identification information of the recognized attribute. Further, the analysis circuit 12 inputs the received comparison data to each of the unit comparison circuits 14a, 14b, . . . , and 14n.

The address control circuit 13 controls the addressing of the lookup table 11. More specifically, the address control circuit 13 recognizes in advance the respective addresses of the storage areas of the lookup table 11, in each of which unit data associated with a specific attribute are stored. Upon receiving the identification information of the attribute from the analysis circuit 12, the address control circuit 13 inputs an address corresponding to the attribute to the lookup table 11, as a reading address.

The unit comparison circuits 14a, 14b, . . . , and 14n compare the comparison data with unit data registered in the lookup table 11. The comparisons are performed e.g. in respect of a match or a mismatch between values. It is also possible to compare the magnitudes of values.

It should be noted that the analysis circuit 12 or the address control circuit 13 can be provided on the side of the comparison data output circuit 20. In this case, comparison data to be identified and a reading address are output from the comparison data output circuit 20, and the packet identification device 10 only performs comparison between the comparison data and the reference data.

In the packet identification device 10 configured as above, when data as a component of a packet is input from the comparison data output circuit 20, the attribute of the input data is analyzed by the analysis circuit 12. When the input data is comparison data, the identification information of the attribute of the comparison data is sent from the analysis circuit 12 to the address control circuit 13. Further, the comparison data is passed from the analysis circuit 12 to the unit comparison circuits 14a, 14b, . . . , and 14b.

Upon receiving the identification information of the attribute, the address control circuit 13 inputs an address associated with the attribute to the lookup table 11, as a reading address, then, unit data, which have the same attribute as the comparison data, of the reference data are input to the respective unit comparison circuits 14a, 14b, . . . , and 14n from the lookup table 11. In the unit comparison circuits 14a, 14b . . . , and 14n, a parallel comparison between the comparison data and the unit data is performed on a bit-by-bit basis, and the results of the comparisons are output.

For example, when identification of an SA (Security Association) of IPsec is to be executed by the packet identification device 10 shown in FIG. 1, the IP address and the like of a terminal unit to be protected are stored in the lookup table 11, as reference data. Then, the IP address of a packet to be transferred is input as comparison data, and an SA ID registered in reference data recognized as a match by the comparison operation is output.

The use of this packet identification device 10 enables hardware to perform high-speed packet identification. Moreover, since the comparison process is performed on a unit data-by-unit data basis, it is possible to prevent an increase in the size of the associated circuits.

It should be noted that parallel connection of packet identification devices 10 of the present invention is possible. In this case, a plurality of packet identification units having the same circuitry as that of the packet identification device 10 shown in FIG. 1 can be connected in parallel with each other to form a single packet identification device.

Figure 2:
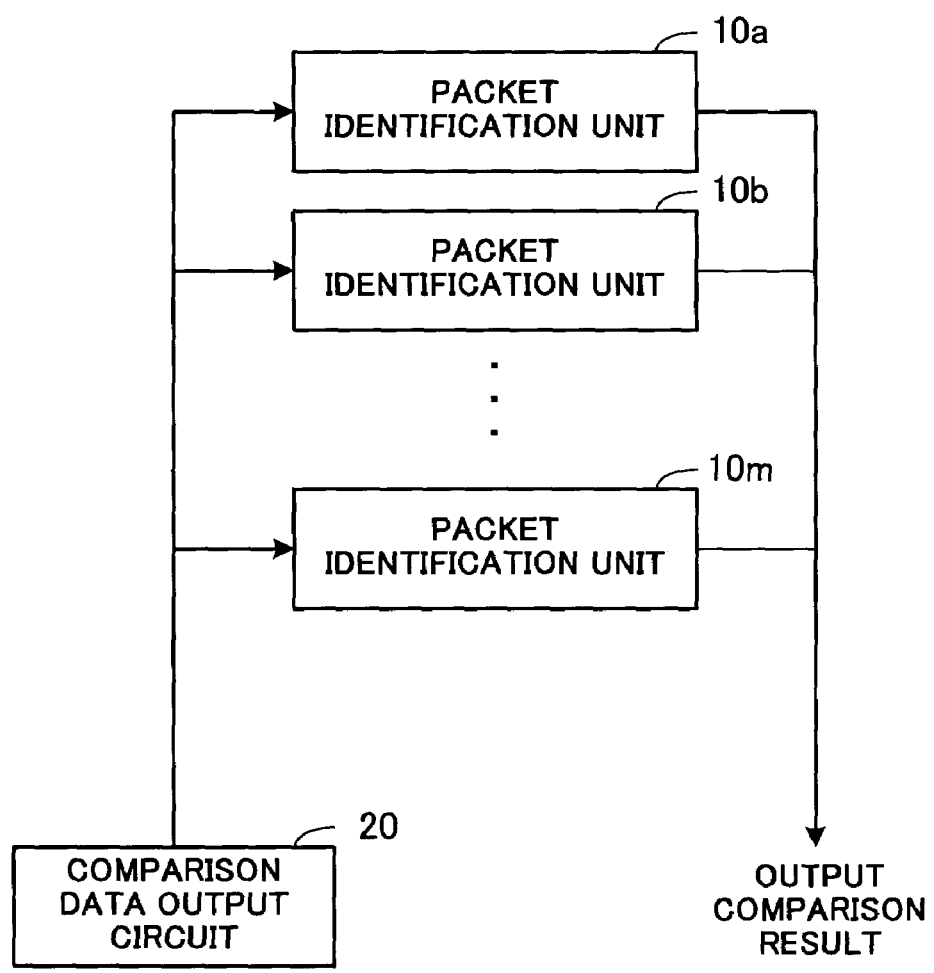
FIG. 2 is a diagram showing packet identification units connected in parallel with each other.

FIG. 2 is a diagram showing packet identification units connected in parallel with each other. As shown in FIG. 2, a plurality of packet identification units 10a, 10b, . . . , and 10m are connected in parallel. The packet identification units 10a, 10b, . . . , and 10m receive common data from the comparison data output circuit 20. The packet identification units 10a, 10b, . . . , and 10m store respective reference data different from each other to perform comparison between comparison data included in the packet and the reference data. Then, a comparison result is output from a packet identification unit having detected the reference data matching the comparison data. The packet identification units that have not detected reference data matching the comparison data output 0 or enter a high impedance state. Thus, the results from all the packet identification units can easily be collected in a single data bus.

As described above, the packet identification units 10a, 10b, . . . , and 10m can be used in parallel. Wiring for parallel connection of the packet identification units 10a, 10b, . . . , and 10m is very simple, so that it is easy to use a plurality of packet identification units in parallel even when comparison of many pieces of information is necessitated. Further, since all comparisons are performed in parallel, there is no difference in processing speed from the case where a single packet identification unit is operated.

Although in the above description, identification of an SA of IPsec is taken as an example, it is to be understood that application of the present invention is not limited to this. For example, the present invention can be used for packet routing, by setting a destination IP address to comparison data and a destination interface to data to be output after detection of a match. Further, the invention can be applied to identifying a NAT connection and outputting an IP address and a port number for conversion, and to a wide range of other uses for packet identification, including packet filtering.

Further, since data sent to the packet identification units at a time is limited to a unit data which is small in data amount, it is possible to reduce the width of the data bus, thereby contributing to simplification of circuit configuration. This makes it possible to reduce the size of the packet identification units, making the units advantageous in installation.

Next, a description will be given of a concrete embodiment the present invention which is applied to a VPN device on the Internet.

Figure 3:
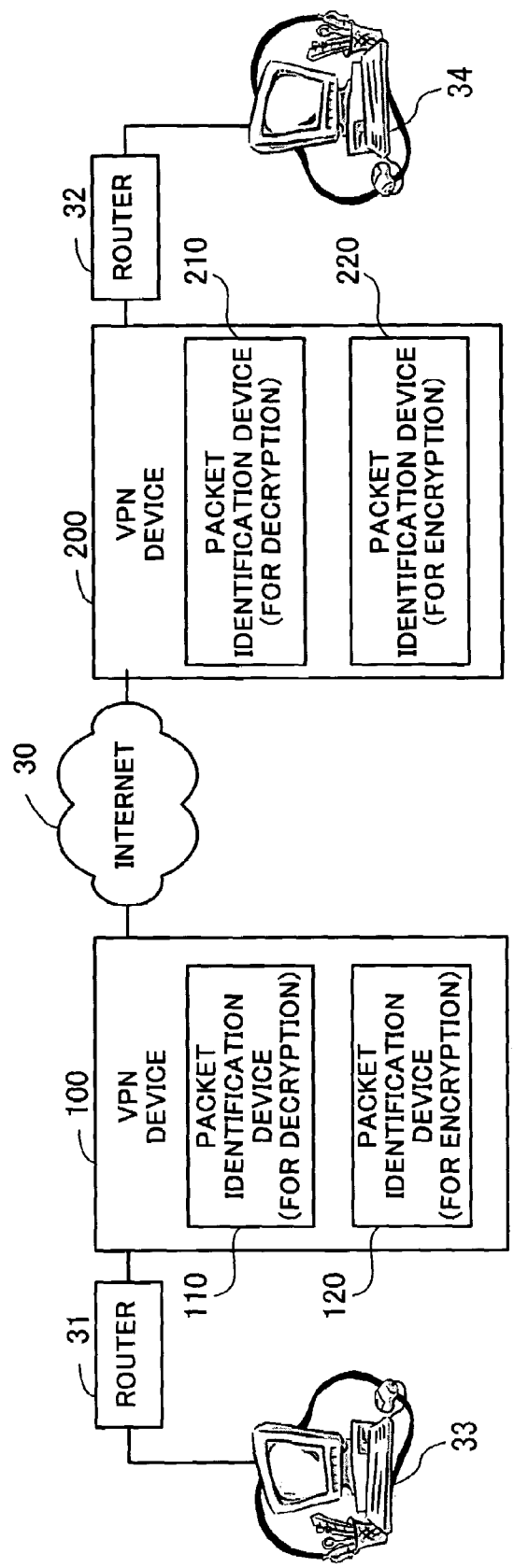
FIG. 3 is a diagram showing an example of a system configuration according to an embodiment of the present invention.

FIG. 3 is a diagram showing an example of a system configuration according to the present embodiment. In the present embodiment, a VPN device 100 incorporates a packet identification device 110 for decryption and a packet identification device 120 for encryption. Similarly, a VPN device 200 incorporates a packet identification device 210 for decryption and a packet identification device 220 for encryption. Each of the VPN devices 100 and 200 has a LAN-side interface and an Internet-side interface.

The VPN devices 100 and 200 are connected to each other via the Internet 30. A terminal unit 33 is connected to the VPN device 100 via a router 31. A terminal unit 34 is connected to the VPN device 200 via a router 32. Each of the VPN devices 100 and 200 encrypts packets sent from the LAN toward the Internet 30, and decrypts encrypted packets received from the Internet 30 and sends the decrypted packets to the associated LAN.

It should be noted that although in the illustrated example, the VPN device 100 (200) and the router 31 (32) are separate from each other, they can be configured as an integral one-piece device.

In the following, the packet identification device 110 of the VPN device 100 will be described in detail as a representative example. It should be noted that the packet identification device 120 for encryption is basically identical in configuration to the packet identification device 110 for decryption except that parameters used for identification are different. Further, the packet identification device 210 for decryption and the packet identification device 220 for encryption, which are provided in the VPN device 200, are identical in configuration and function to the packet identification devices 110 and 120 of the VPN device 100, respectively. For simplicity of description, it is assumed here that packet authentication is not executed, but authentication function can easily be additionally provided.

Figure 4:
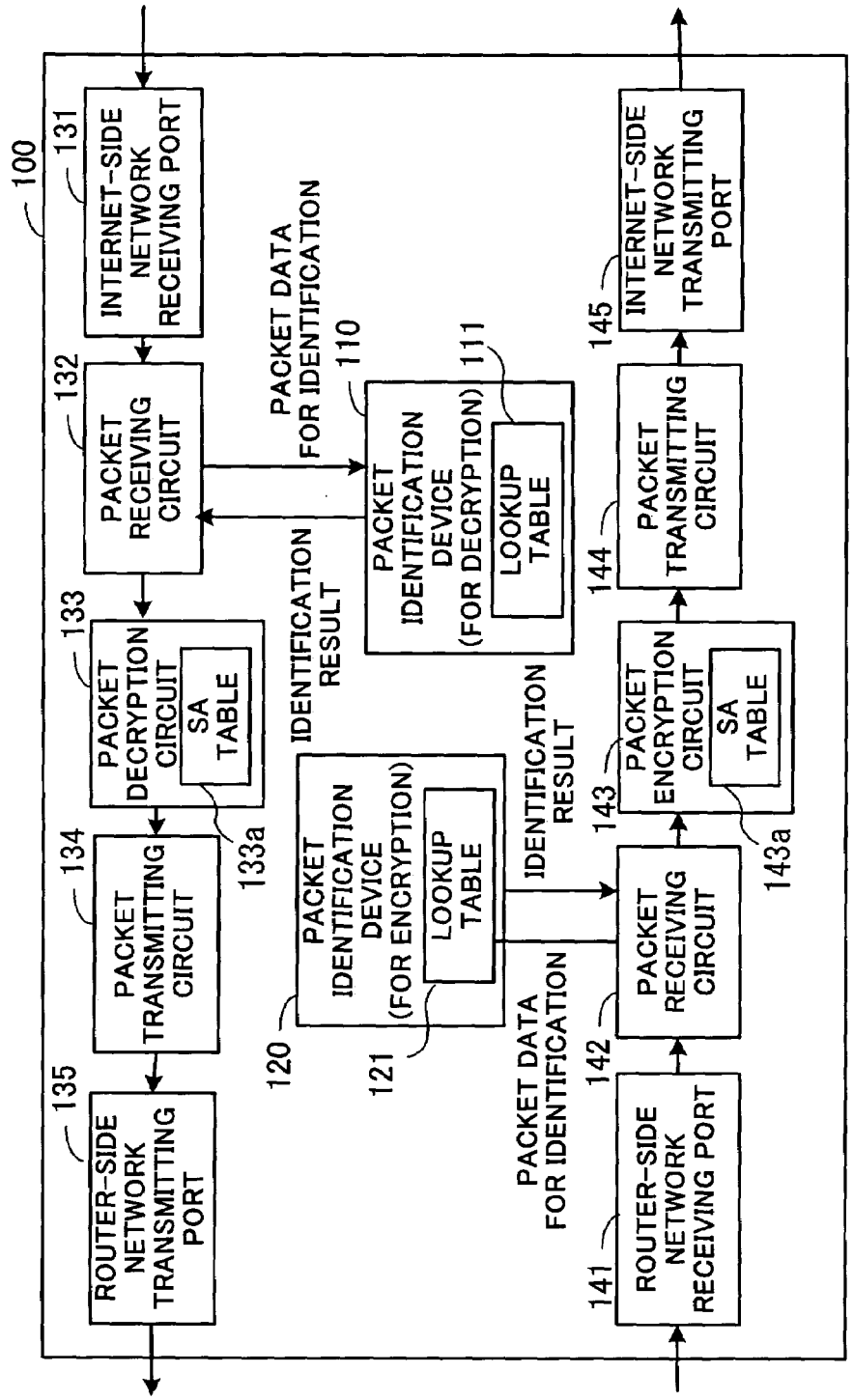
FIG. 4 is a block diagram showing an example of the internal configuration of a VPN device.

FIG. 4 is a diagram showing an example of the internal configuration of the VPN device. The VPN device 100 includes not only the packet identification device 110 for decryption and the packet identification device 120 for encryption, but also other component elements referred to hereinafter:

The packet identification device 110 for decryption has a lookup table 111, and performs comparison between reference data in the lookup table 111 and a packet for identification to thereby identify an SA (Security Association) for the packet. Then, the packet identification device 110 returns an SA ID as an identification result.

Similarly, the packet identification device 120 for encryption has a lookup table 121, and performs comparison between reference data in the lookup table 121 and a packet for identification to thereby identify an SA for the packet. Then, the packet identification device 120 for encryption returns an SA ID as an identification result.

As component elements for data transfer from the Internet 30 to the LAN, there are provided an Internet-side network receiving port 131, a packet receiving circuit 132, a packet decryption circuit 133, a packet transmitting circuit 134, and a router-side network transmitting port 135.

The Internet-side network receiving port 131 is connected to the Internet 30, and outputs packets received via the Internet 30 to the packet receiving circuit 132.

The packet receiving circuit 132 receives the packets input from the Internet-side network receiving port 131. Then, the packet receiving circuit 132 sequentially outputs data in the received packets to the packet identification device 110. Upon receiving an SA ID as an identification result from the packet identification device 110, the packet receiving circuit 132 adds the SA ID to each associated packet to send the packet having the SA ID attached thereto to the packet decryption circuit 133.

The packet decryption circuit 133 has an SA table 133a. In the SA table 133a, SAs are set in association with respective SA IDs. The packet decryption circuit 133 selects an SA for packet decryption based on the SA ID delivered from the packet receiving circuit 132, and decrypts the packet using the SA. The packet decryption circuit 133 delivers the decrypted packet to the packet transmitting circuit 134.

The packet transmitting circuit 134 is connected to the router-side network transmitting port 135, and sends the decrypted packet to the LAN via the router-side network transmitting port 135.

The router-side network transmitting port 135 is a communication port connected to the router 31 via the LAN.

As component elements for data transfer from the LAN to the Internet 30, there are provided a router-side network receiving port 141, a packet receiving circuit 142, a packet encryption circuit 143, a packet transmitting circuit 144, and an Internet-side network transmitting port 145.

The router-side network receiving port 141 is connected to the router 31 via the LAN, and outputs packets received via the LAN to the packet receiving circuit 142.

The packet receiving circuit 142 receives the packets input from the router-side network receiving port 141. Then, the packet receiving circuit 142 sequentially outputs data in the received packets to the packet identification device 120. Upon receiving an SA ID as an identification result from the packet identification device 120, the packet receiving circuit 142 adds the SA ID to the associated packet to send the packet having the SA ID attached thereto to the packet encryption circuit 143.

The packet encryption circuit 143 has an SA table 143*a*. In the SA table 143*a*, SAs are set in association with respective SA IDs. The packet encryption circuit 143 selects an SA for packet encryption based on the SA ID delivered from the packet receiving circuit 142, and encrypts the packet using the SA. The packet encryption circuit 143 delivers the encrypted packet to the packet transmitting circuit 144.

The packet transmitting circuit 144 is connected to the Internet-side network transmitting port 145, and sends the encrypted packet to the Internet 30 via the Internet-side network transmitting port 145.

The Internet-side network transmitting port 145 is a communication port connected to the Internet 30.

It should be noted that in the packet identification devices 110 and 120, there is pre-registered information required for carrying out encryption and decryption.

FIG. 5 is a diagram showing an example of the data structure of the lookup table. The lookup table 111 is provided with the columns of SA ID, Valid, Src-IP, Dst-IP, SPI (Security Parameter Index), and Control. Information items arranged in each row are associated with each other to form an entry.

SA ID represents identification information for identifying a registered entry.

Valid represents a flag indicating whether registered data associated with the SA ID is valid (1) or invalid (0).

Src-IP represents a source IP address. In processing a packet, the packet identification device 110 compares a source IP address in the packet with information in the Src-IP fields. It should be noted that IP.Router-B appearing in FIG. 5 represents the IP address of the router 32.

Dst-IP represents a destination IP address. In processing a packet, the packet identification device 110 compares a destination IP address with information in the Dst-IP fields. "Don't care" in a field in the Dst-IP column indicates that comparison of a destination IP address can be omitted according to settings in the associated Control field, referred to hereinafter. It should be noted that IP.Router-A appearing in FIG. 5 represents the IP address of the router 31.

SPI represents information for identifying an SA. In processing a packet, the packet identification device 110 compares an SPI parameter in the ESP header with information in the SPI fields.

Control represents a 2-bit flag indicating whether or not comparison is necessary. If a bit[0] in a Control field is set to 1, comparison of an associated Src-IP address is not performed, whereas if the bit[0] is set to 0, comparison of the associated Src-IP address is performed. Further, if a bit[1] is set to 1, comparison of an associated Dst-IP address is not performed, whereas if the bit[1] is set to 0, comparison of the associated Dst-IP is performed.

It should be noted that the data structure of the lookup table 121 incorporated in the packet identification device 120 for encryption is substantially the same as that of the lookup table 111 shown in FIG. 5. However, the lookup table 121 is provided with the columns of Src-ports (source port numbers) and Dsc-ports (destination port numbers) as items for comparison, in addition to the columns of Src-IP and Dst-IP. The packet identification device 120 performs comparisons of Src-IPs, Dst-IPs, Src-ports and Dsc-ports.

FIG. 6 is a diagram showing an example of the data structure of the SA table. The SA table 133*a* is provided with the columns of SA ID, Valid, DECODE_KEY, and DES/3DES. Information items arranged in each row are associated with each other to form an entry.

SA ID represents identification information for identifying a registered entry and indicating an associated record in the lookup table 111.

DECODE_KEY represents a secret key for decryption. In FIG. 6, a decryption key is represented by KEY 1 or KEY 2.

DES/3DES represents information indicative of encryption/decryption methods. When information in this field is set to 0, DES is used as a decryption protocol, and when the information is set to 1, 3DES is used as a decryption protocol.

The information stored in the SA table 133*a* may be contained in the lookup table 111. In this case, information items registered in the associated DECODE_KEY and DES/3DES fields are output as identification results.

It should be noted that the SA table 143*a* incorporated in the packet encryption circuit 143 has the same data structure as shown in FIG. 6.

By using the VPN device 100 configured as above, encryption and decryption of packets transmitted via the Internet 30 can be performed. Although FIGS. 4 to 6 show the configuration of the VPN device 100, the VPN device 200 has the same configuration as the VPN device 100.

Next, a detailed description will be given of a process in which the VPN device 100 execute packet decryption upon reception an encrypted packet from the Internet 30.

First, a packet input to the Internet-side network receiving port 131 is received by the packet receiving circuit 132. Then, the packet receiving circuit 132 delivers data forming the packet to the packet identification device 110 for decryption.

The packet identification device 110 identifies the packet based on the received data, and delivers an identification result (SA ID) to the packet receiving circuit 132. The identification result is passed from the packet receiving circuit 132 to the packet decryption circuit 133.

The packet decryption circuit 133 fetches a decryption protocol and a secret key for decryption from the SA table 133*a* based on the received SA ID, and decrypts the packet. This process can also be performed by software.

As described above, the use of the present packet identification device makes it possible to achieve high-speed SA ID identification in the VPN device 100.

Although in the above description, the packet decrypting process in the VPN device 100 is explained by way of example, the present invention can also be easily applied to identification of a NAT connection, routing, filtering, etc. by changing data (field) for comparison. By pre-registering data associated with a variety of fields, the same identification device can be used for various applications. Further, it is possible to use a subnet mask in a field associated with an IP address.

Next, a description will be given of the internal configuration of the packet identification device.

Figure 7:
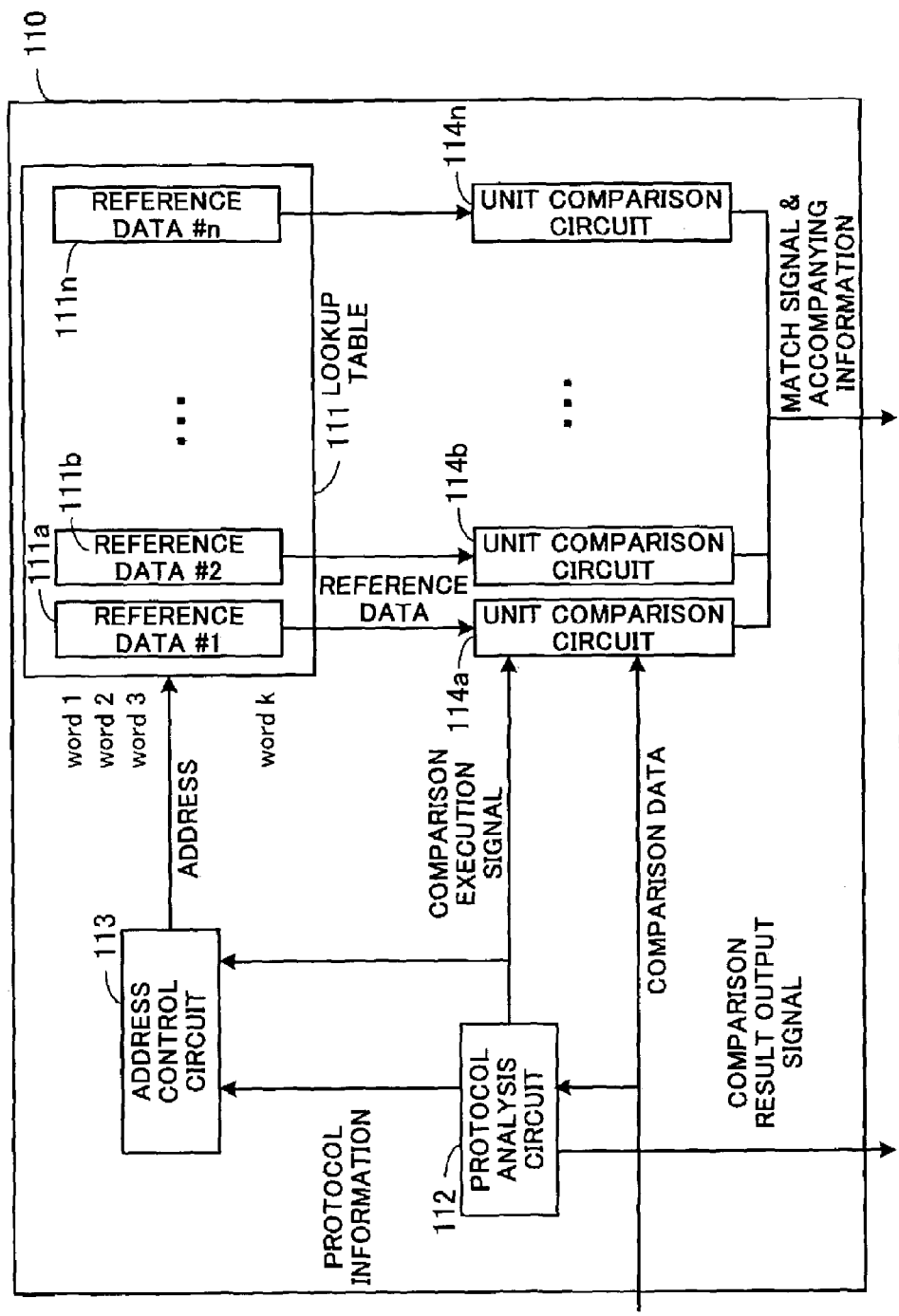
FIG. 7 is a block diagram showing the internal configuration of a packet identification device.

FIG. 7 is a block diagram showing the internal configuration of the packet identification device. The packet identification device 110 is provided with the lookup table 111, a protocol analysis circuit 112, an address control circuit 113, and a plurality of unit comparison circuits 114*a*, 114*b*, ..., and 114*n*.

The lookup table 111 stores a plurality of reference data 111a, 111b, ..., and 111n. Each of the reference data 111a, 111b, ..., and 111n is divided into unit data, and each unit data is stored in an address assigned to a protocol thereof. It should be noted that the respective addresses of protocols are defined in the order of the arrangement of comparison data items in the packet. More specifically, an address associated with the protocol of a comparison data item to be input earlier is set to a smaller value.

Packet data to be identified is input to the protocol analysis circuit 112 on a unit data-by-unit data basis. The protocol analysis circuit 112 analyzes the attribute of each input unit data (i.e. a protocol on which the unit data is based) and determines whether or not the unit data is comparison data. For example, an IP address in an IP header and a port number in a TCP header are determined as comparison data. It should be noted that the protocol of each unit data can be identified based on a predetermined definition of the data structure (data format) of the IP packet.

Upon detection of input of the comparison data, the protocol analysis circuit 112 outputs a comparison execution signal to each of the unit comparison circuits 114a, 114b ..., and 114n. At the same time, the protocol analysis circuit 112 passes information (protocol information) indicative of the protocol of the comparison data to the address control circuit 113.

The protocol analysis circuit 112 can be implemented by a counter and a state machine that recognizes each field, such as an IP header. The protocol analysis circuit 112 outputs a control signal (comparison condition-setting signal) for setting comparison conditions immediately before outputting each comparison item, such as an IP address or a TCP port number, and then outputs comparison data from a buffer as required. This process will be described in detail hereinafter.

The address control circuit 113 supplies an address for reading out data to the lookup table 111 according to the comparison execution signal and the protocol information output from the protocol analysis circuit 112. More specifically, unit data of each reference data item in the lookup table 111 are arranged in accordance with the order of input of comparison data items, and therefore the address control circuit 113 controls addressing such that unit data are each sequentially read whenever a comparison execution signal is received, starting with "word 1".

Although in the present embodiment, unit data are assumed to be sequentially read starting with "word 1" for simplicity, this is not limitative, but the address control method depends on how reference data are registered. Further, in the case of setting comparison conditions immediately before passing a comparison item, such as an IP address or a TCP port, the address control circuit 113 detects timing in which each comparison item is input, based on the protocol information, and controls addressing such that comparison conditions for the item are read out from the lookup table 111 in the detected timing.

The unit comparison circuits 114a, 114b, ..., and 114n perform bit-by-bit comparison between data received from the comparison data output circuit and the reference data 111a, 111b, ..., and 111n read out from the lookup table 111, on a unit data-by-unit data basis. There are arranged in parallel the same number of unit comparison circuits 114a, 114b, ..., and 114n as the number of reference data 111a, 111b, ..., and 111n that can be registered in the lookup table 111.

In each of the unit comparison circuits 114a, 114b, ..., 114n, information as to whether or not a matching state between the comparison data and the reference data has been continuing from first unit data to current unit data is held until the end of the comparison process. Therefore, the unit comparison circuits 114a, 114b, ..., 114n need to contain at least one 1-bit register for judging whether or not the matching state is continuing. Further, registers for storing comparison conditions associated with the comparison items, such as "Exclude the TCP port number from comparison objects" and "Use the designated subnet mask for IP address comparison", and information of "a subnet mask to be used", are required in addition to the above-mentioned 1-bit register. If the registers for storing comparison conditions were provided in association with respective comparison items, the size of each comparison circuit would be inevitably increased. In the present embodiment, however, since comparison conditions are set immediately before input of data of a comparison item, it is possible to reduce the size of the circuit.

Figure 8:
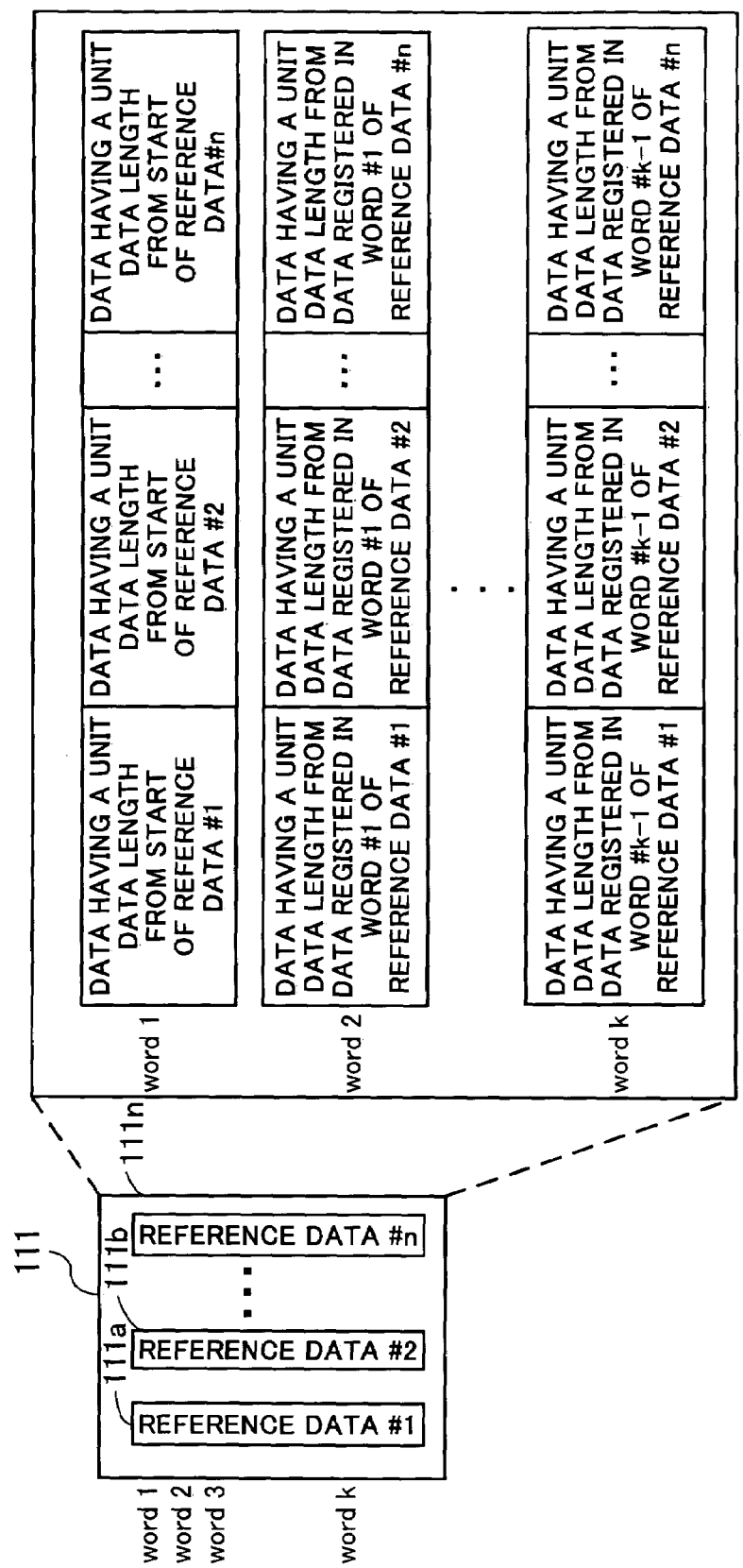
FIG. 8 is a diagram showing storage areas for data stored in the lookup table.

FIG. 8 is a diagram showing storage areas for data stored in the lookup table. As shown in FIG. 8, in a storage area "word 1" in the lookup table 111, data having a unit data length from the start of the reference data #1, data having a unit data length from the start of the reference data #2, ..., and data having a unit data length from the start of the reference data #n are registered in parallel. Storage areas "word 2" and "word 3" et seq. store data registered in the same manner as the storage area "word 1".

Although in the reference data registering method shown in FIG. 8, the lookup table is configured such that a unit data having an address (word number) assigned a smallest value comes first in each reference data, this is not limitative, but it is possible to adopt any registration order deemed appropriate in the relationship with the address control method. Further, the type of a memory to be used in the lookup table 111 is not limited to SRAM or DRAM, but FIFO may be used, for example.

In the following, the function of the packet identification device 110 will be described in detail. In the following description, it is assumed that the length of unit data for comparison (unit comparison data length) is 8 bit, and for simplicity, source and destination IP addresses are compared. However, it is to be understood that the unit comparison data length and comparison data are not limited to these examples.

FIG. 9 is a diagram showing an example of divided registration of reference data. As shown in FIG. 9, the reference data 111a is divided into 1-byte unit data, and each unit data is stored in an individual address.

In an address "0", a flag is set which indicates the validity of the reference data 111a. If the reference data 111a is valid, Bit0 is set to "1", whereas if the reference data 111a is invalid, Bit0 is set to "0".

In an address "1", a flag is set which indicates whether or not comparison of the source IP address is necessary. If the comparison of the source IP address is necessary, Bit0 is set to "1", whereas if the comparison of the source address is unnecessary, Bit0 is set to "0". Further, Bit[5:1] is set to a value of "subnet mask length−1".

An address "2" stores the first byte of the source IP address. An address "3" stores the second byte of the source IP address. An address "4" stores the third byte of the source IP address. An address "5" stores the last byte of the source IP address.

In an address "6", a flag is set which indicates whether or not the comparison of the destination IP address is necessary. If the comparison of the destination IP address is necessary, Bit0 is set to "1", whereas if the comparison of the destination address is unnecessary, Bit0 is set to "0". Further, Bit[5:1] is set to the value of "subnet mask length −1".

An address "7" stores the first byte of the destination IP address. An address "8" stores the second byte of the destination IP address. An address "9" stores the third byte of the destination IP address. An address "10" stores the last byte of the destination IP address.

In an address "11", a flag is set which indicates whether or not the comparison of the SPI is necessary. Bit0 indicates whether or not the comparison is necessary, and in the present embodiment, Bit0 is always set to a value "1" indicating that the comparison is necessary. Further, Bit[5:1] is fixed to a value of 31.

An address "12" stores the first byte of the SPI. An address "13" stores the second byte of the SPI. An address "14" stores the third byte of the SPI. An address "15" stores the last byte of the SPI.

An address "16" stores an SA ID.

It should be noted that in the illustrated example, not only reference data, but also comparison conditions (in the present example, whether or not to execute comparison, and "subnet mask length −1") for each reference data item and an SA ID as output data are registered. The reason for registering not the subnet mask length but "the subnet mask length −1" is to save the bit width of each register. To compare all bits without using the subnet, the value of "subnet mask length −1" has only to be set to 31.

Figure 10:
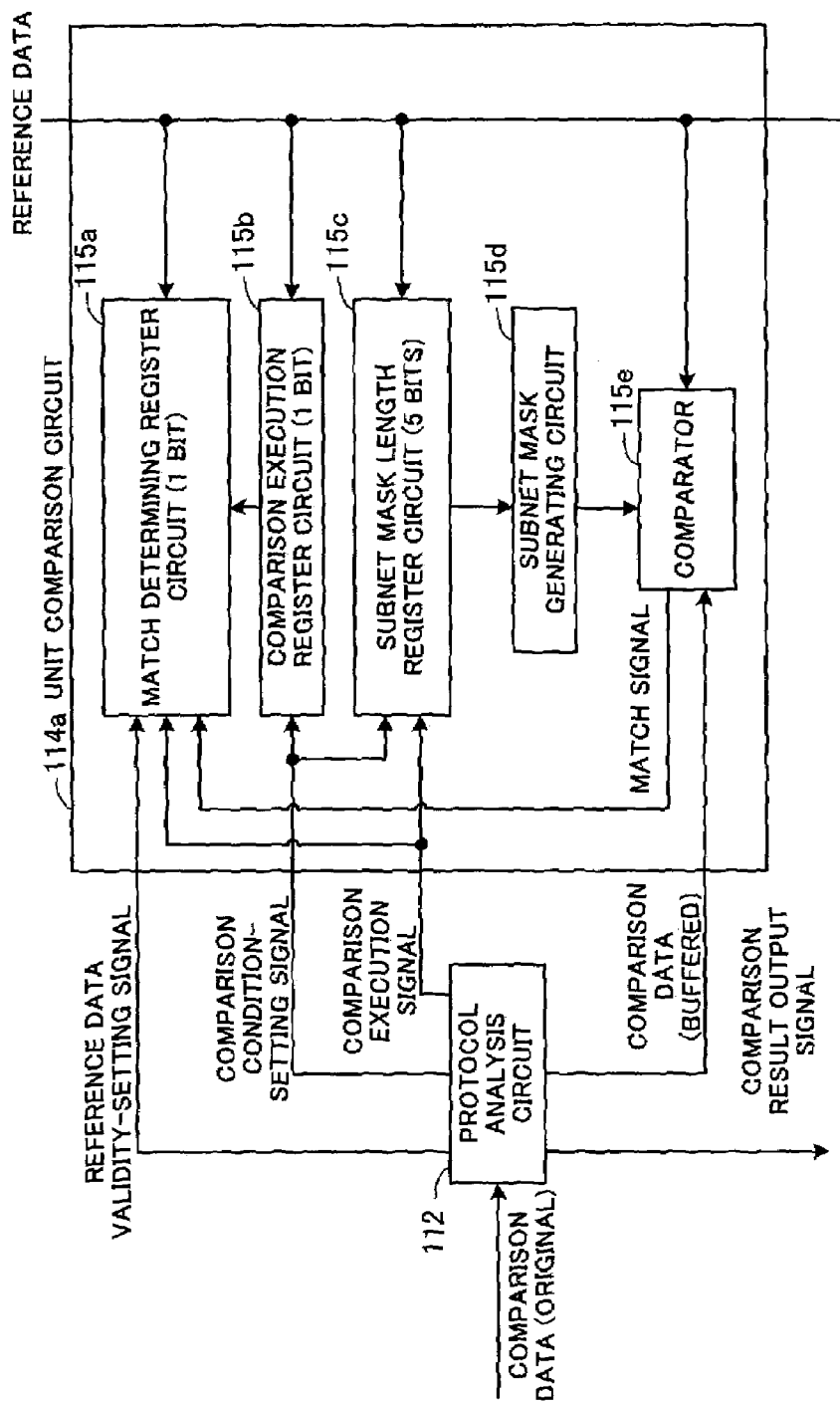
FIG. 10 is a block diagram showing the internal configuration of a unit comparison circuit.

FIG. 10 is a block diagram showing the internal configuration of the unit comparison circuit. The unit comparison circuit 114a includes a match determination register circuit 115a, a comparison execution register circuit 115b, and a subnet mask length register circuit 115c, as registers. These register circuits include a data holding circuit and logic circuit. The logic circuit performs the input and output of data to the data holding circuit. Further, the unit comparison circuit 114a is provided with a subnet mask generating circuit 115d and a comparator 115e.

The registers are formed by 7 bits in total: 1 bit for the match determination register circuit 115a, 1 bit for the comparison execution register circuit 115b, and 5 bits for the subnet mask length register circuit 115c.

It should be noted that in the present embodiment, comparison conditions are set for each reference item, so that the 7 bits in total of the registers suffice. If the comparison conditions for the reference items were to be set at a time, a comparison execution register circuit and a subnet mask length register circuit would have to be provided for each of a source IP address and a destination IP address, so that the total capacity of the registers would amount to 13 bits including one bit for the match determination register circuit 115a, which substantially doubles the circuit size.

Each of the registers receives a bit or bits of associated reference data (unit data). Further, the match determination register circuit 115a receives a reference data validity-setting signal and a comparison execution signal from the protocol analysis circuit 112 and a match signal from the comparator 115e. The comparison execution register circuit 115b receives a comparison condition-setting signal from the protocol analysis circuit 112. The subnet mask length register circuit 115c receives the comparison condition-setting signal and the comparison execution signal from the protocol analysis circuit 112.

The subnet mask generating circuit 115d generates a mask for comparison data in accordance with a value set to the subnet mask length register circuit 115c. The subnet mask generating circuit 115d inputs generated mask data to the comparator 115e.

The comparator 115e applies a subnet mask to the comparison data, and then performs comparison of the comparison data with reference data. If a match is detected by the comparison, the comparator 115e outputs the match signal.

It should be noted that FIG. 10 shows the internal configuration of the unit comparison circuit 114a as a representative example, but the other unit comparison circuits 114b, . . . , and 114n have the same internal configuration as the circuit 114a.

Further, as described hereinafter, the protocol analysis circuit 112 has the function of storing original comparison data as required, and delaying timing in outputting of the data to the unit comparison circuits 114a, 114b, . . . , and 114n.

Figure 11:
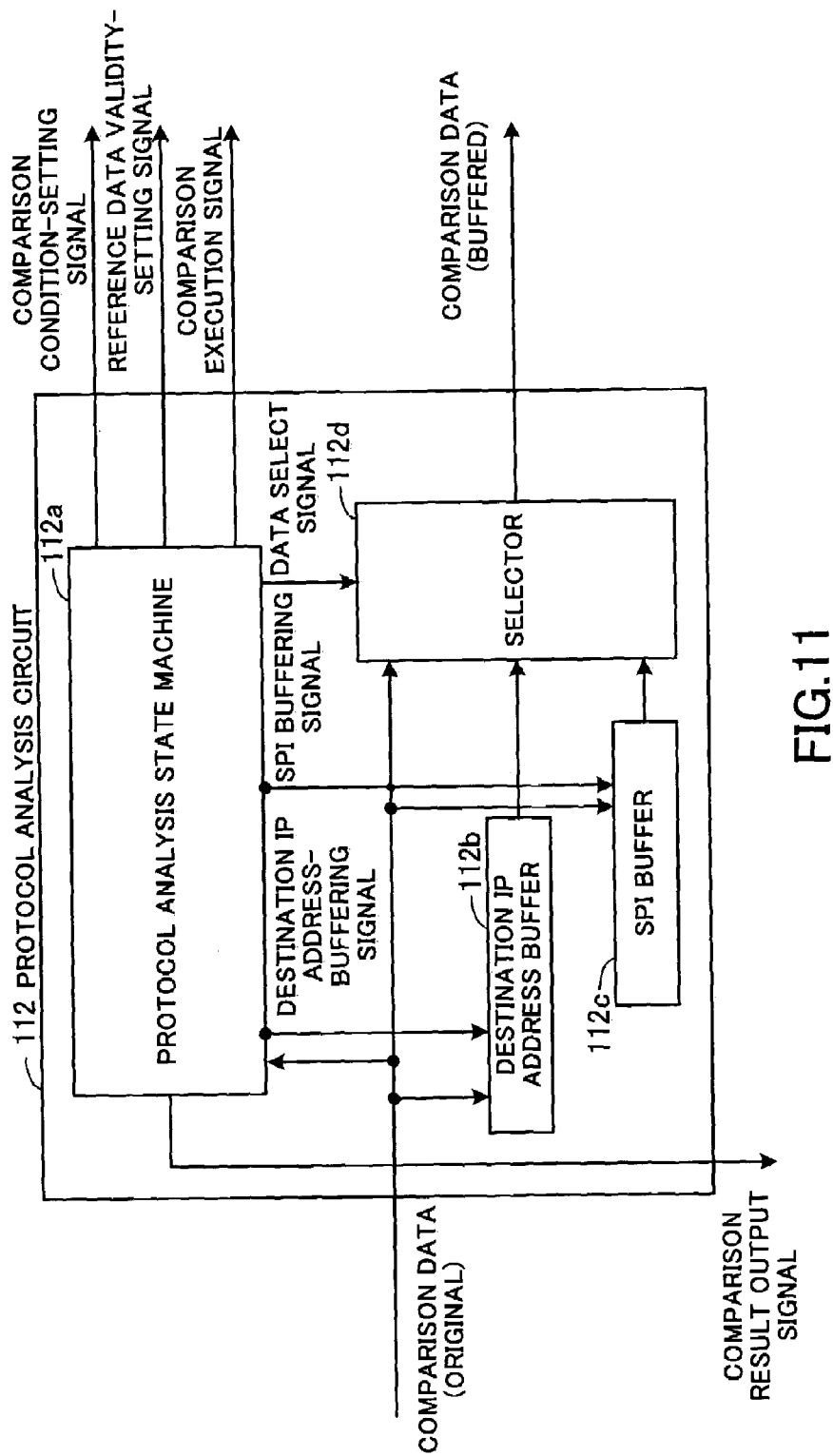
FIG. 11 is a block diagram showing the internal configuration of a protocol analysis circuit.

FIG. 11 is a block diagram showing the internal configuration of the protocol analysis circuit 112. The protocol analysis circuit 112 is comprised of a protocol analysis state machine 112a, a destination IP address buffer 112b, an SPI buffer 112c, and a selector 112d.

The protocol analysis state machine 112a receives original comparison data. The protocol analysis state machine 112a analyzes the header of an input packet and recognizes which parameter of the packet a received data item corresponds to. When receiving data to be compared with reference data, the protocol analysis state machine 112a outputs the control signals.

The control signals output from the protocol analysis state machine 112a include the comparison condition-setting signal, the reference data validity-setting signal, and the comparison execution signal. These signals are output to the address control circuit 113 and unit comparison circuits 114a, 114b, . . . , and 114n. Further, the protocol analysis state machine 112a outputs a destination IP address-buffering signal, an SPI buffering signal, and a data select signal, as control signals, to the destination IP address buffer 112b, the SPI buffer 112c, and the selector 112d, respectively.

The destination IP address buffer 112b is a storage area for buffering a destination IP address. When the destination IP address-buffering signal is input from the protocol analysis state machine 112a, the destination IP address buffer 112b stores currently input comparison data (destination IP address).

The SPI buffer 112c is a storage area for buffering SPI data. When the SPI buffering signal is input from the protocol analysis state machine 112a, the SPI buffer 112c stores currently input comparison data (SPI).

The selector 112d selects data to be output, from among the original comparison data, the data stored in the destination IP address buffer 112b and the data stored in the SPI buffer 112c, based on the data select signal from the protocol analysis state machine.

Although in the configuration shown in FIG. 11, data is fetched into the destination IP address buffer 112b when the destination IP address-buffering signal is output from the protocol analysis state machine 112a, the destination IP address buffer 112b may be simply configured to operate as a one stage buffer for storing comparison data instead of using the destination IP address-buffering signal. Similarly, the SPI buffer 112c may be simply configured to operate as a two stage buffer for storing comparison data without using the SPI buffering signal.

Next, the operation of the protocol analysis circuit configured as above will be described with reference to FIGS. 12 and 13. In the following description, it is assumed that the lookup table 111 is implemented by a synchronous memory which outputs data in a cycle described below, after determination of an address.

Figure 12:
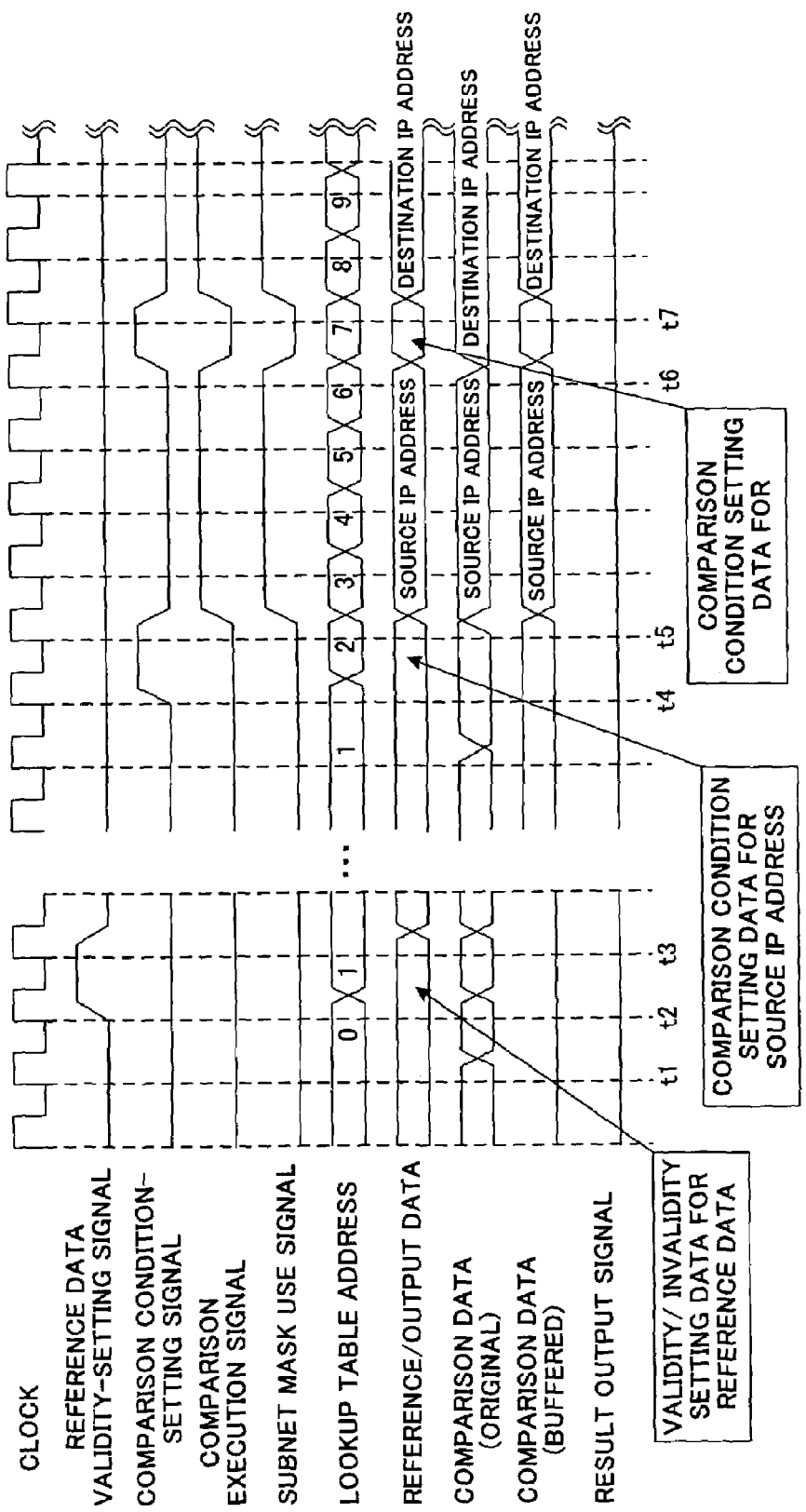
FIG. 12 is a first half of a timing diagram showing an example of operation of the protocol analysis circuit.

FIG. 12 is the first half of a timing diagram showing an example of the operation of the protocol analysis circuit. FIG. 13 is the second half of the timing diagram.

Figure 13:
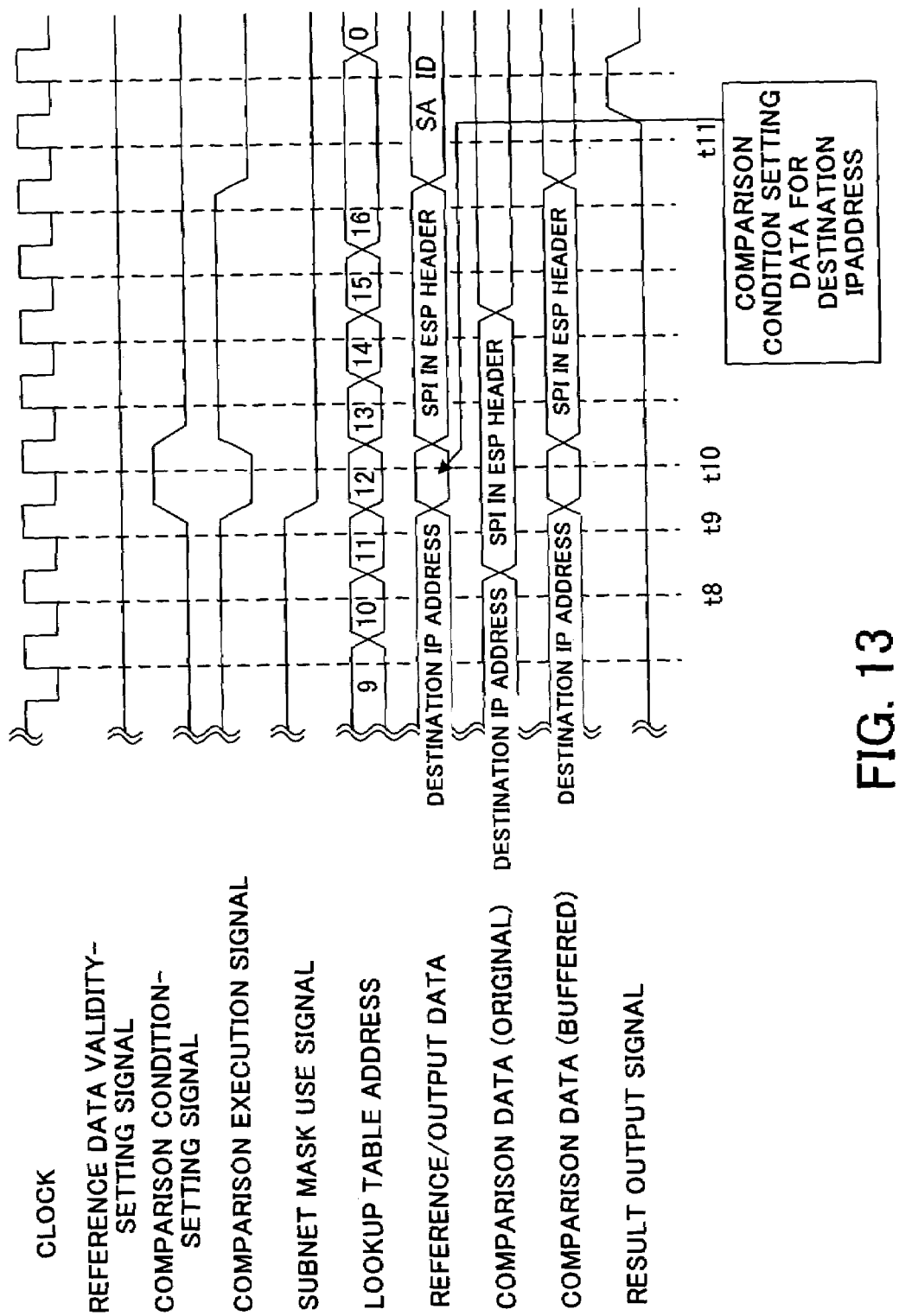
FIG. 13 is a second half of the timing diagram showing the example of the operation of the protocol analysis circuit.

In FIGS. 12 and 13 are shown, from top to bottom, a synchronizing clock signal (clock), the reference data validity-setting signal, the comparison condition-setting signal, the comparison execution signal, a subnet mask use signal, a lookup table address, reference/output data, comparison data (original), comparison data (buffered), and a result output signal, which are used in the protocol analysis circuit.

Before an IP packet (original comparison data) is input, the lookup table address "0" is continuously output from the address control circuit 113. Consequently, data for setting validity/invalidity of reference data are output from the lookup table 111.

The IP packet (original comparison data) is input at a time t1.

At a time t2 which corresponds to a second rise time of the clock, the address of the lookup table output from the address control circuit 113 is switched to "1". Further, the reference data validity-setting signal is asserted high by the protocol analysis state machine 112a. As a result, the values of valid bits of the reference data are stored in the respective match determination register circuits 115a of the unit comparison circuits 114a, 114b, . . . , and 114n. If the valid bit of a reference unit data is valid "1", packet comparison is performed by a corresponding unit comparison circuit.

At a time t3, comparison condition setting data for source IP addresses are output from the lookup table 111.

At a time t4 before input of the data of the source IP address, the comparison condition-setting signal is asserted high. As a result, the comparison condition setting data for the source: IP addresses are stored in the comparison execution register circuits 115b of the unit comparison circuits 114a, 114b, . . . , and 114n, and the values of "the subnet mask length mask −1" are stored in the subnet mask length register circuits 115c of the same. If comparison condition setting data for a source IP address shows comparison "1", comparison of the source IP address is performed by a corresponding unit comparison circuit. At the same time, the address of the lookup table output from the address control circuit 113 is switched to "2".

At a time t5, the source IP address is input as comparison data, and unit data of source IP addresses as reference data are output from the lookup table 111. At this time, the comparison execution signal and the subnet mask use signal are asserted high by the protocol analysis state machine 112a. As a result, unit comparison circuits corresponding to valid reference data perform comparison according to the comparison conditions. At this time, the address of the lookup table output from the address control circuit 113 is switched to "3".

Thereafter, the address of the lookup table output from the address control circuit 113 in synchronism with the clock signal is switched to "4", "5" and "6". In the meantime, source IP address comparison is continuously carried out.

The destination IP address follows the source IP address, as comparison data. Immediately before comparison of the destination IP address is started, the comparison condition-setting signal is asserted high at a time t6, and comparison condition setting data for destination IP addresses are stored in the associated comparison execution registers circuits 115b. At this time point, input of the destination IP address as original comparison data has been started, but reference data and buffered comparison data have not been output yet. More specifically, since comparison condition setting was performed, input of the reference data is delayed by one cycle assuming that the comparison data is being continuously input.

At a time t7 one cycle after the time 6, the comparison execution signal and the subnet mask use signal are asserted high. At the same time, unit data of destination IP addresses as reference data are output from the lookup table 111, and the destination IP address which has been buffered as comparison data over a time period corresponding to one cycle is output from the protocol analysis circuit 112. Thus, the comparison of the destination IP address is started.

After the comparison of the destination IP address is completed, the comparison conditions for the SPI in the ESP header are set, and then comparison of the SPI value in the ESP header is started.

Assuming that the reference data is being continuously input, at a time t8 when the comparison of the destination IP address is being carried out, the SPI in the ESP header is input to the protocol analysis circuit 112. At a time t9 after completion of the comparison of the destination IP address, the comparison condition-setting signal is asserted high, and the comparison conditions for the SPI are stored. When the comparison data is being continuously input, the above operation causes delay of input of the reference data with respect to that of the comparison data by two cycles. Therefore, in comparing the SPI in the ESP header, the protocol analysis circuit 112 executes data output at a time t10 after buffering the comparison data over a time period corresponding to two cycles.

Thus, the comparisons of all the items are completed. Then, at a time t11, a comparison result output signal is output from the protocol analysis circuit 112. If there is a match between all the compared items, an associated SA ID is output as an identification result.

Comparison data and reference data are thus compared.

In the following, the details of a process executed by each circuit will be described with reference to flowcharts.

Figure 14:
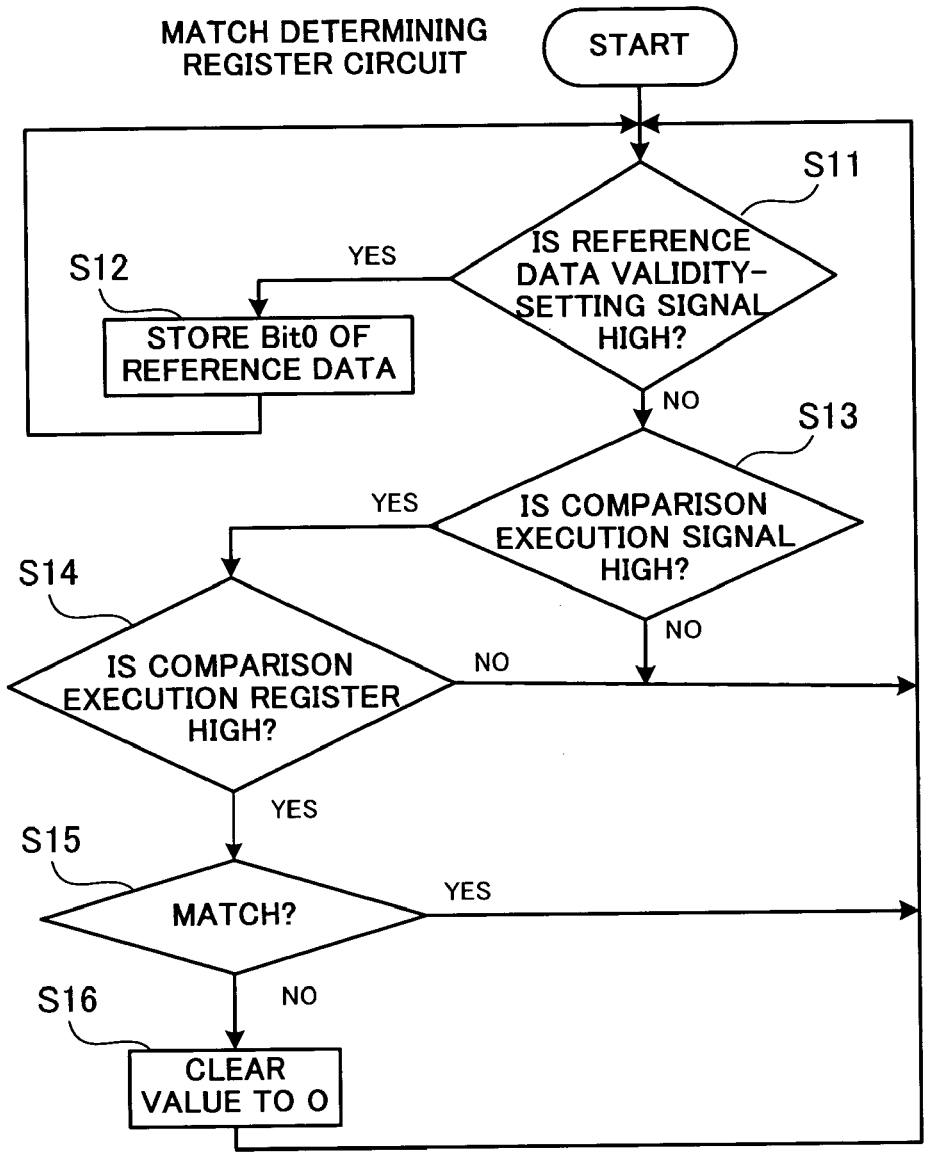
FIG. 14 is a flowchart showing a process executed by a match determination register circuit.

FIG. 14 is a flowchart showing a process executed by the match determination register circuit 115a. The process shown in FIG. 14 will be described below in the order of step numbers.

[Step S11] The match determination register circuit 115a determines whether or not the reference data validity-setting signal is asserted high. If the reference data validity-setting signal is asserted high, the process proceeds to a step S12, whereas if the reference data validity-setting signal is not asserted high, the process proceeds to a step S13.

[Step S12] When the reference data validity-setting signal is asserted high, the match determination register circuit 115a stores the value of a valid bit (Bit0) of the reference data. If the reference data is valid, the valid bit (Bit0) is set to "1", whereas if the reference data is invalid, the valid bit (Bit0) is set to "0". Then, the process returns to the step S11.

[Step S13] The match determination register circuit 115a determines whether or not the comparison execution signal is asserted high. If the comparison execution signal is asserted high, the process proceeds to a step S14, whereas if the comparison execution signal is not asserted high, the process returns to the step S11.

[Step S14] The match determination register circuit 115a determines whether or not the value of the comparison execution register circuit 115b is at a high level. If the value is high, the process proceeds to a step S15, whereas if the value is set low, the process returns to the step S11.

[Step S15] The match determination register circuit 115a determines whether or not a high-level match signal (indicative of a match detected as a comparison result) is being output from the comparator 115e. If the high-level match signal is being output, the value stored in the register is held, and the process returns to the step S11. If the high-level match signal is not being output, the process proceeds to a step S16.

[Step S16] The match determination register circuit 115*a* clears the value stored in the register to 0. Then, the process returns to the step S11.

As described above, when the reference data validity-setting signal becomes high, the value of 1 is stored in the match determination register circuit 115*a*. Further, if the comparison execution signal becomes high, and the comparison result of the comparator 115*e* shows a match when the comparison execution register is set high, the value of 1 is held in the match determination register circuit 115*a*. On the other hand, if the comparison result of the comparator 115*e* does not show a match, the value stored in the match determination register circuit 115*a* is cleared to 0.

Figure 15:
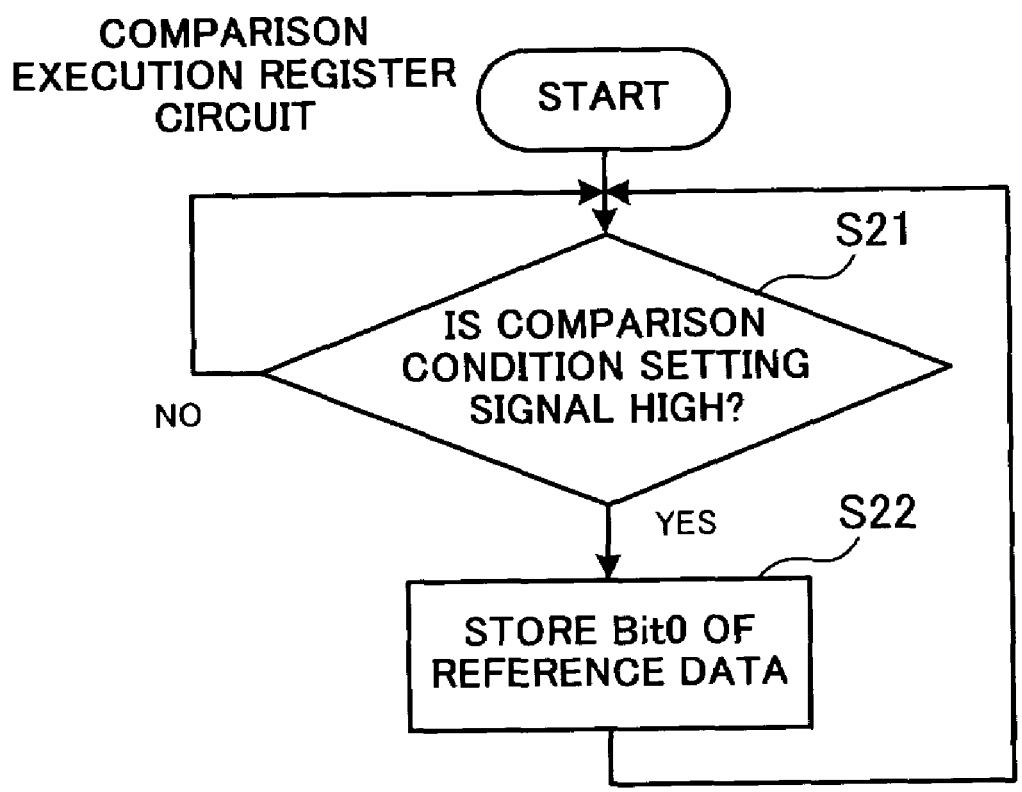
FIG. 15 is a flowchart showing a process executed by a comparison execution register circuit.

FIG. 15 is a flowchart showing a process executed by the comparison execution register circuit 115*b*. The process shown in FIG. 15 will be described below in the order of step numbers.

[Step S21] The comparison execution register circuit 115*b* determines whether or not the comparison condition-setting signal is at a high level. If the signal is low, the step S21 is repeatedly executed until the signal is asserted high, whereas if the signal is high, the process proceeds to a step S22.

[Step S22] The comparison execution register circuit 115*b* stores Bit0 of reference data. When a comparison is valid, a value of 1 (indicative of high output) is stored, whereas when the comparison is invalid, a value of 0 (indicative of low output) is stored. Then, the process returns to the step S21.

Figure 16:
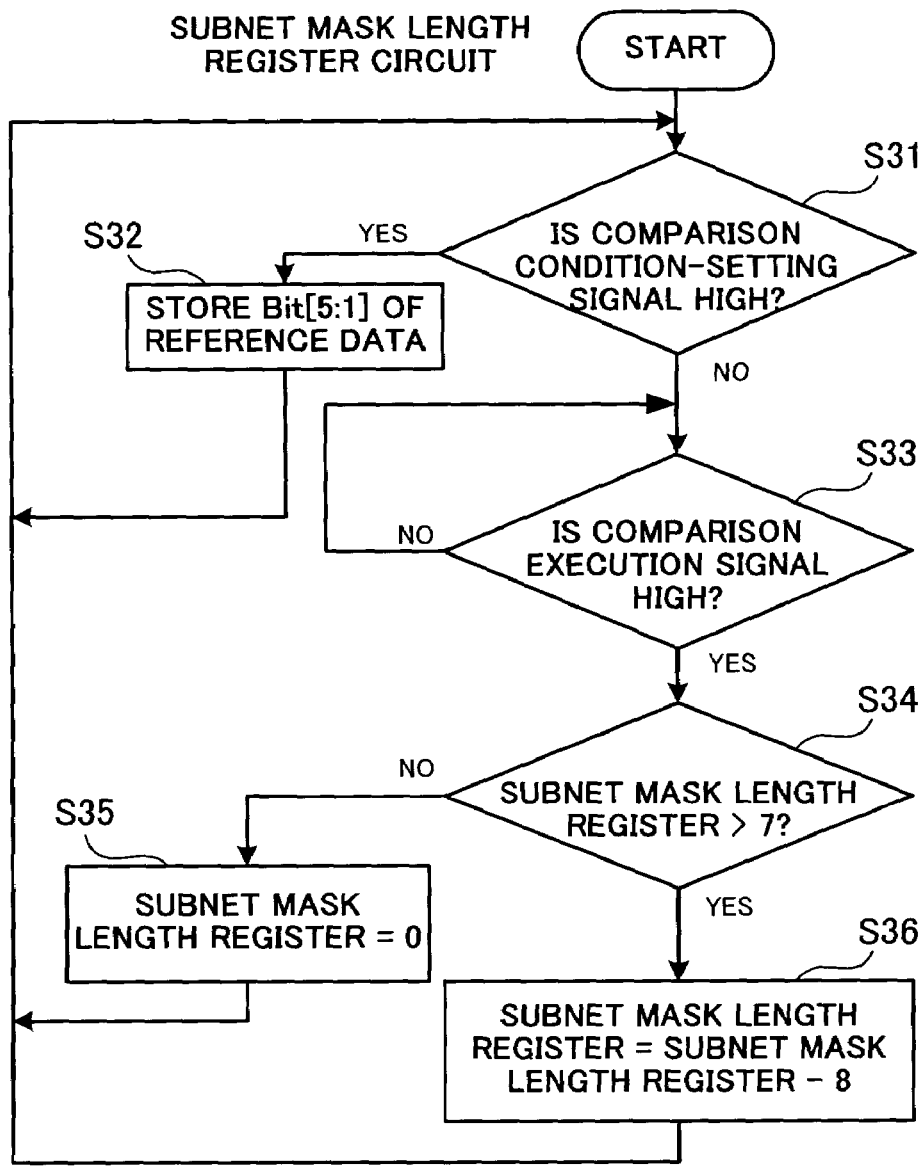
FIG. 16 is a flowchart showing an internal process executed by a subnet mask length register circuit.

FIG. 16 is a flowchart showing an internal process executed by the subnet mask length register circuit 115*c*. The process shown in FIG. 16 will be described below in the order of step numbers.

[Step S31] The subnet mask length register circuit 115*c* determines whether or not the comparison condition-setting signal is at a high level. If the signal is low, the process proceeds to a step S33, whereas if the signal is high, the process proceeds to a step S32.

[Step S32] The subnet mask length register circuit 115*c* stores Bit[5:1] of reference data. Bit[5:1] of reference data is indicative of the value of "the subnet mask length −1". Then, the process returns to the step S31.

[Step S33] The subnet mask length register circuit 115*c* determines whether or not the comparison execution signal is at a high level. If the signal is low, the step S33 is repeatedly executed until the signal is asserted high, whereas if the signal is high, the process proceeds to a step S34.

[Step S34] The subnet mask length register circuit 115*c* determines whether or not the value set thereto is larger 5 than 7. If the value is larger than 7, the process proceeds to a step S36. If the value is equal to or smaller than 7, the process proceeds to a step S35.

[Step S35] The subnet mask length register circuit 115*c* sets the subnet mask length register to 0. Then, the process returns to the step S31.

[Step S36] The subnet mask length register circuit 115*c* subtracts 8 from the current value set thereto. Then, the process returns to the step S31.

As described above, in the subnet mask length register circuit 115*c*, when the comparison condition-setting signal is asserted high, the value of the corresponding bit of reference data is stored, and when comparison execution signal is asserted high, 8 is subtracted from the value. This subtraction is repeatedly carried out until the value becomes equal to 0.

Next, an internal process executed by the address control circuit will be described in detail with reference to FIGS. 17 to 19.

Figure 17:
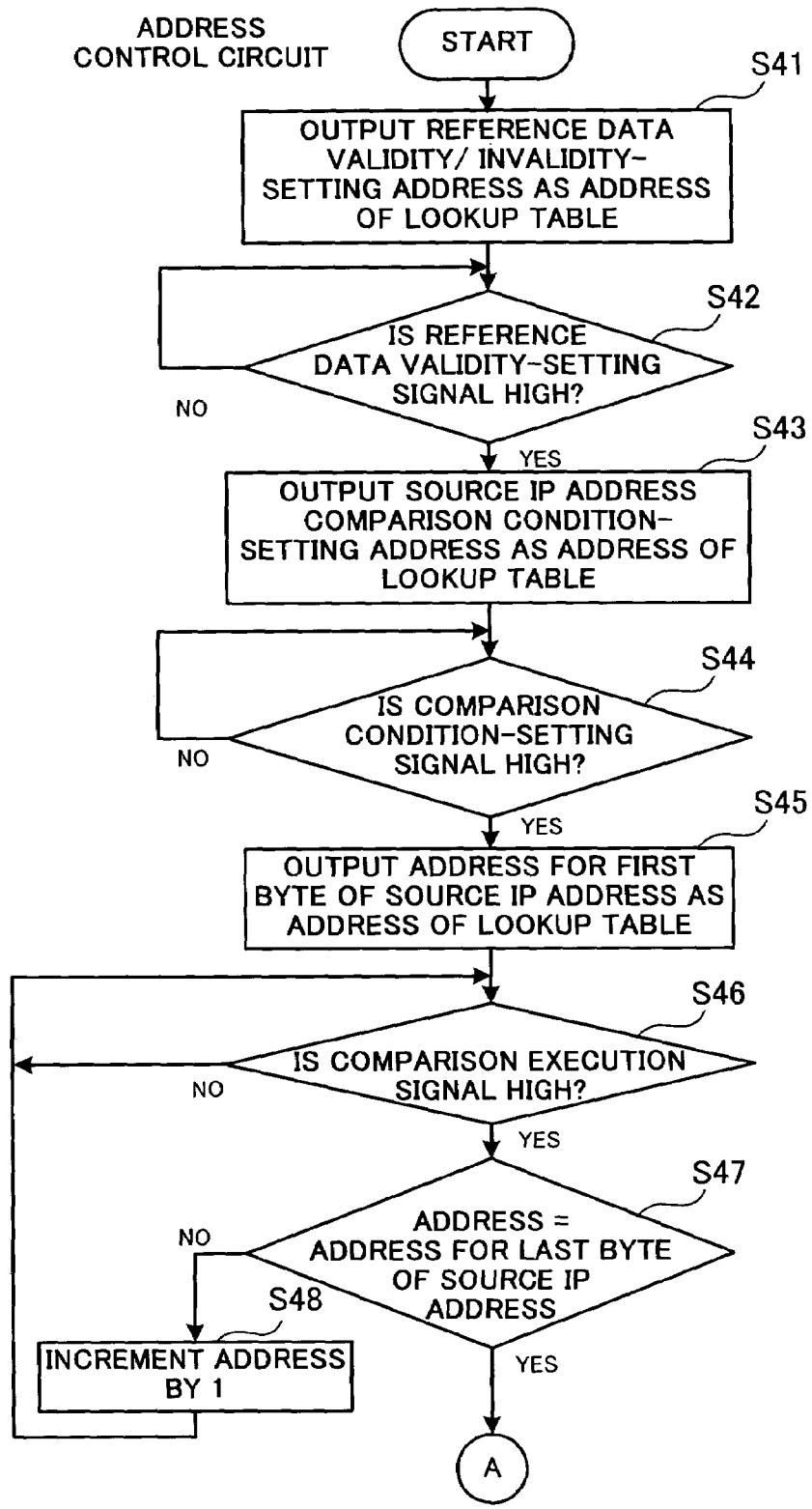
FIG. 17 is a first flowchart showing an internal process executed by an address control circuit.

FIG. 17 is a first flowchart showing the internal process executed by the address control circuit. The process shown in FIG. 17 will be described below in the order of step numbers.

[Step S41] The address control circuit 113 outputs a reference data validity/invalidity-setting address as an address of the lookup table 111.

[Step S42] The address control circuit 113 determines whether or not the reference data validity-setting signal is at a high level. If the signal is low, the step S42 is repeatedly executed until the signal is asserted high, whereas if the signal is high, the process proceeds to a step S43.

[Step s43] The address control circuit 113 outputs a source IP address comparison condition-setting address as an address of the lookup table 111.

[Step S44] The address control circuit 113 determines whether or not the comparison condition-setting signal is at a high level. If the signal is low, the step S44 is repeatedly executed until the signal is asserted high, whereas if the signal is high, the process proceeds to a step S45.

[Step S45] The address control circuit 113 outputs an address for the first one byte of the source IP address as an address of the lookup table 111.

[Step S46] The address control circuit 113 determines whether or not the comparison execution signal is at a high level. If the signal is low, the step S46 is repeatedly executed until the signal is asserted high, whereas if the signal is high, the process proceeds to a step S47.

[Step S47] The address control circuit 113 determines whether or not the currently output address is an address for the last one byte of the source IP address. If the address is the address for the last one byte, the process proceeds to a step S51 in FIG. 18. If the address is not the address for the last one byte, the process proceeds to a step S48.

[Step S48] The address control circuit 113 outputs an address obtained by adding 1 to the currently output address as an address of the lookup table. Then, the process returns to the step S46.

Figure 18:
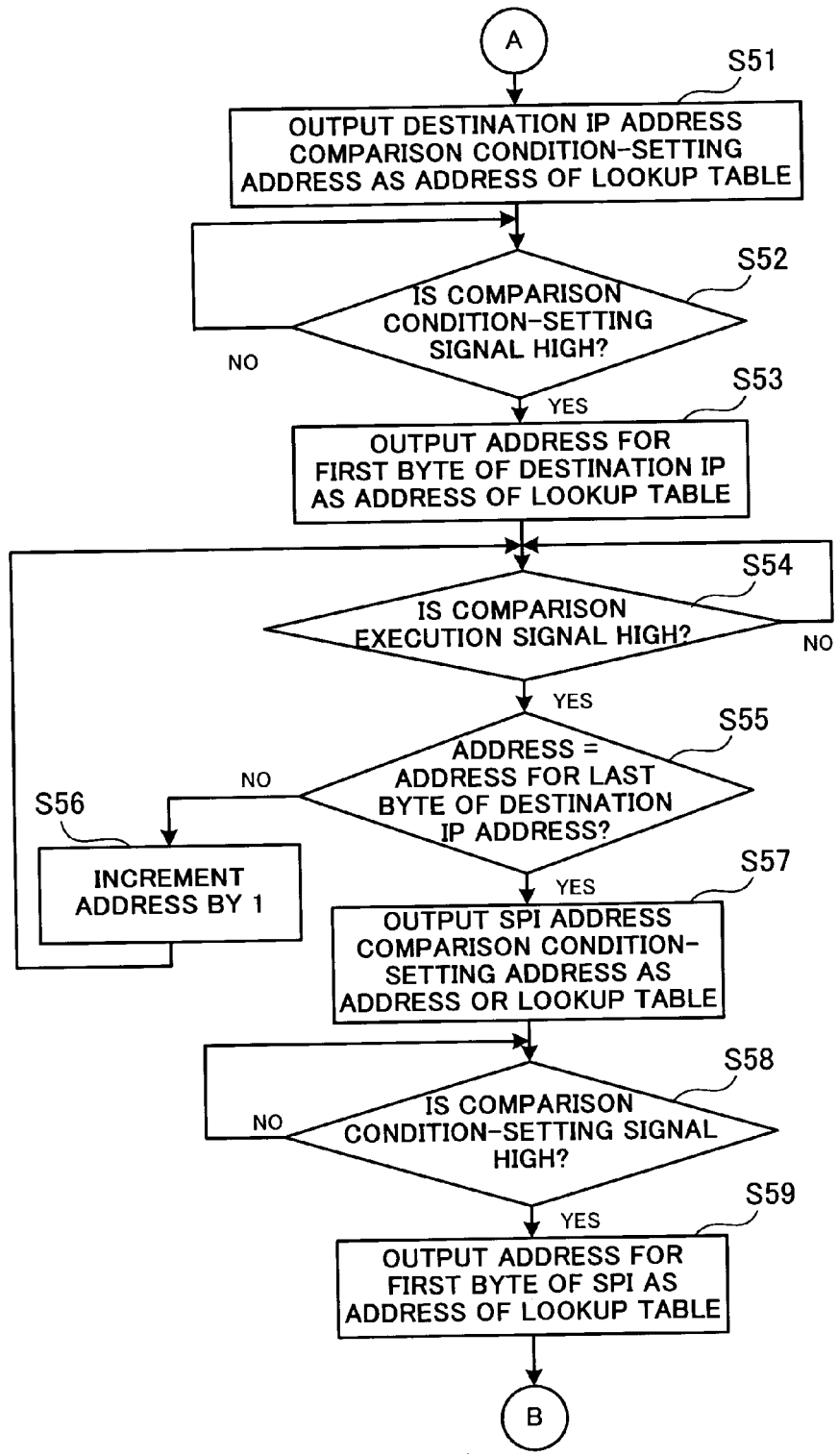
FIG. 18 is a second flowchart showing the internal process executed by the address control circuit.

FIG. 18 is a second flowchart showing the internal process executed by the address control circuit. The process shown in FIG. 18 will be described below in the order of step numbers.

[Step S51] The address control circuit 113 outputs a destination IP address comparison condition-setting address as an address of the lookup table 111.

[Step S52] The address control circuit 113 determines whether or not the comparison condition-setting signal is at a high level. If the signal is low, the step S52 is repeatedly executed until the signal is asserted high, whereas if the signal is high, the process proceeds to a step S53.

[Step S53] The address control circuit 113 outputs an address for the first one byte of the determination IP address as an address of the lookup table 111.

[Step S54] The address control circuit 113 determines whether or not the comparison execution signal is at a high level. If the signal is low, the step S54 is repeatedly executed until the signal is asserted high, whereas if the signal is high, the process proceeds to a step S55.

[Step S55] The address control circuit 113 determines whether or not the currently output address is an address for the last one byte of the determination IP address. If the address is the address for the last one byte, the process proceeds to a step S57. If the address is not the address for the last one byte, the process proceeds to a step S56.

[Step S56] The address control circuit 113 outputs an address obtained by adding 1 to the currently output address as an address of the lookup table. Then, the process returns to the step S54.

[Step S57] The address control circuit 113 outputs an SPI comparison condition-setting address as an address of the lookup table 111.

[Step S58] The address control circuit 113 determines whether or not the comparison condition-setting signal is at a high level. If the signal is low, the step S58 is repeatedly executed until the signal is asserted high. If the signal is high, the process proceeds to a step S59.

[Step S59] The address control circuit 113 outputs an address for the first one byte of the SPI as an address of the lookup table 111. Then, the process proceeds to a step S61 in FIG. 19.

Figure 19:
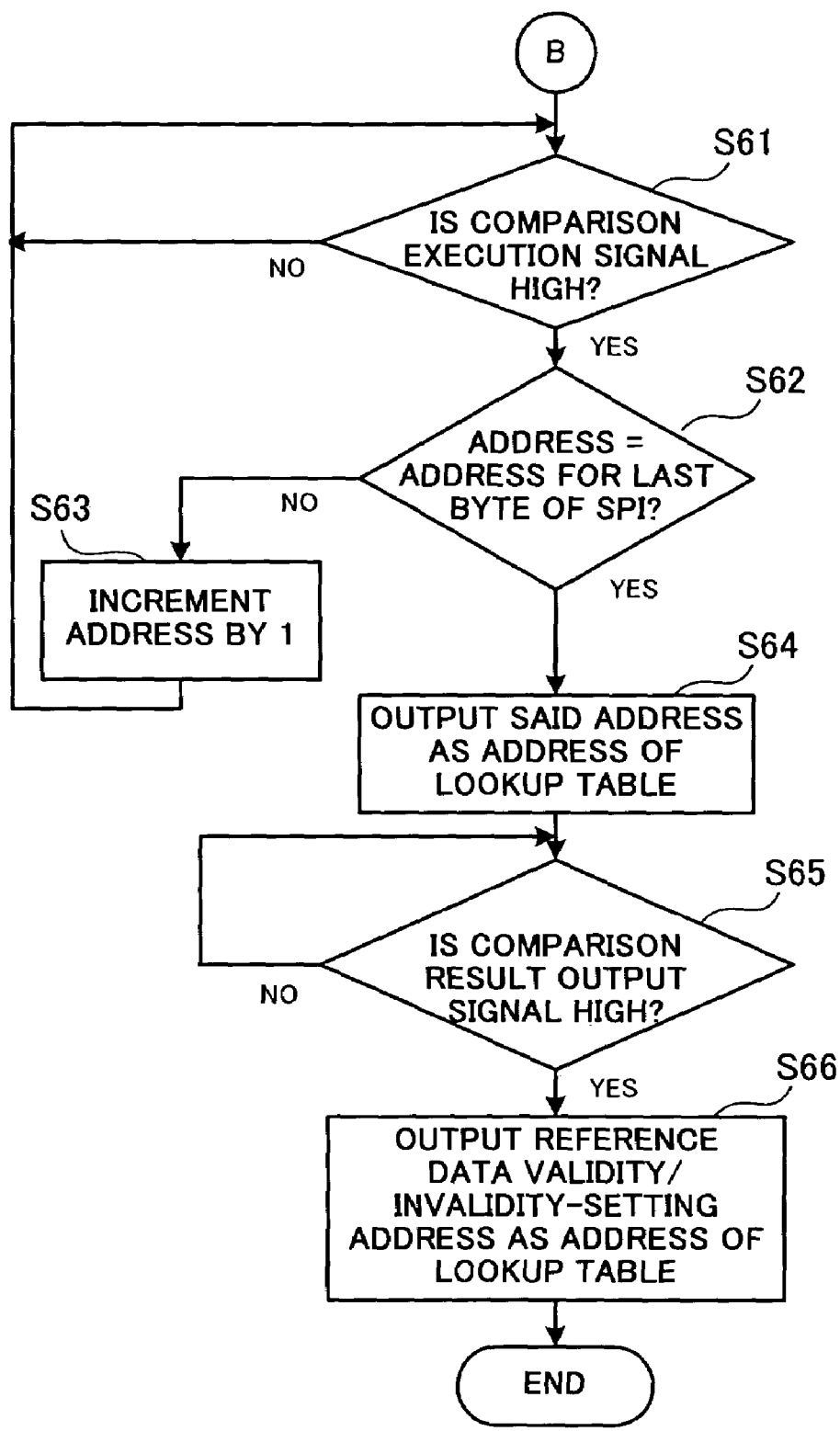
FIG. 19 is a third flowchart showing the internal process executed by the address control circuit.
Figure 21:
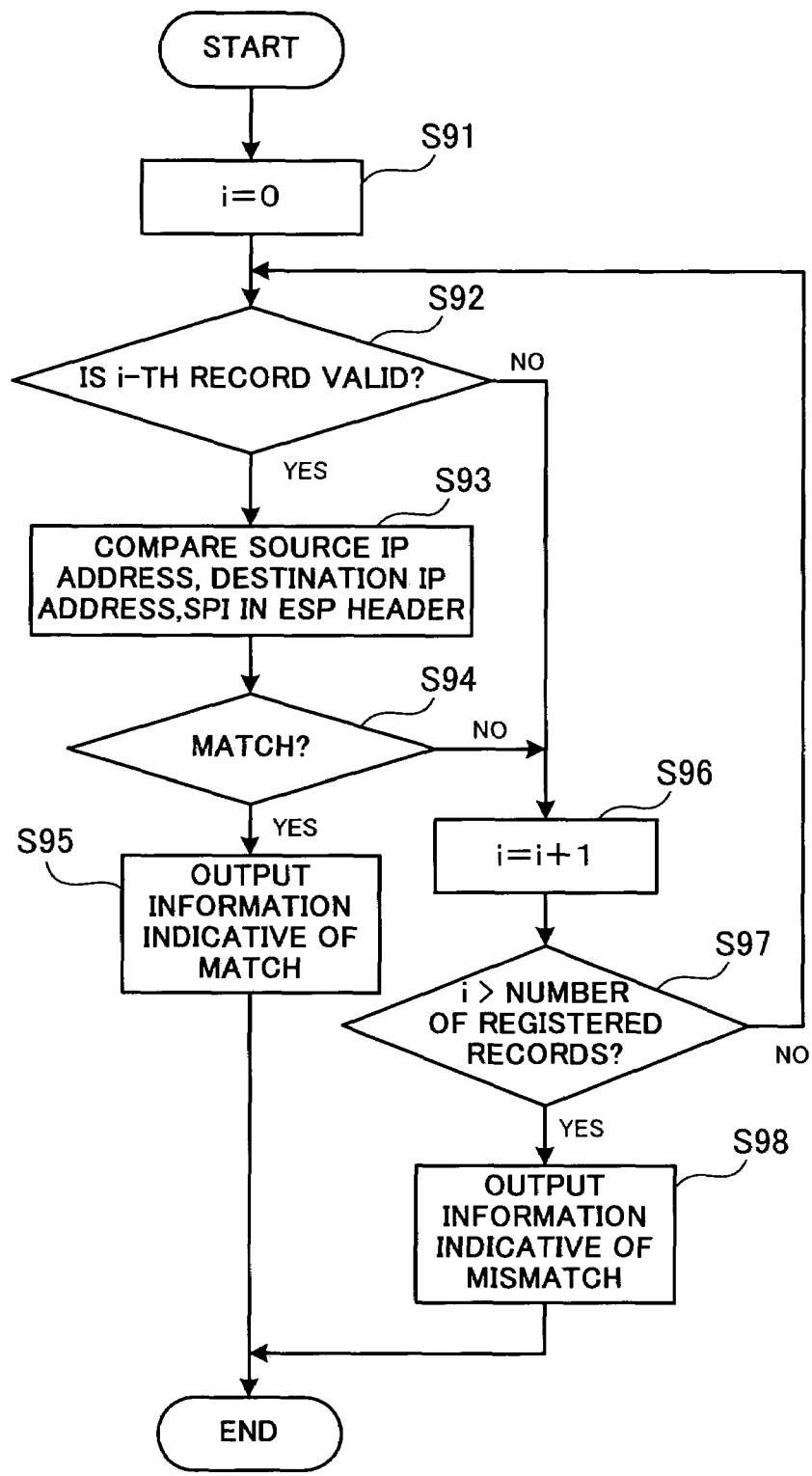
FIG. 21 is a flowchart showing a conventional packet identification process.

FIG. 19 is a third flowchart showing the internal process executed by the address control circuit. The process shown in FIG. 19 will be described below in the order of step numbers.

[Step S61] The address control circuit 113 determines whether or not the comparison execution signal is at a high level. If the signal is low, the step S61 is repeatedly executed until the signal is asserted high. If the signal is high, the process proceeds to a step S62.

[Step S62] The address control circuit 113 determines whether or not the currently output address is an address for the last one byte of the SPI. If the address is the address for the last one byte, the process proceeds to a step S64. If the address is not the address for the last one byte, the process proceeds to a step S63.

[Step S63] The address control circuit 113 outputs an address obtained by adding 1 to the currently output address as an address of the lookup table. Then, the process returns to the step S61.

[Step S64] The address control circuit 113 outputs an SA ID address as an address of the lookup table 111.

[Step S65] The address control circuit 113 determines whether or not the comparison result output signal is at a high level. If the signal is low, the step S65 is repeatedly executed until the signal is asserted high. If the signal is high, the process proceeds to a step S66.

[Step S66] The address control circuit 113 outputs the reference data validity/invalidity-setting address as an address of the lookup table 111.

Thus, the identification of the input packet can be executed. In the above-described embodiment, reference data are output from the lookup table on a unit data-by-unit data basis and a comparison is performed between each unit data and comparison data. Therefore, the unit comparison circuits have only to be configured such that a number of bits (e.g. 8 bits) corresponding to the data length of each unit data can be compared simultaneously. This makes it possible to avoid an increase in the size of each circuit.

In addition, the lookup table used in the present embodiment is configured similarly to a general RAM or the like such that data are output from the lookup table in response to the input of an address. In other words, it is not required to use a CAM. This contributes to reduction of the unit price of the packet identification device.

Further, the packet identification units according to the present embodiment can be easily connected in parallel. Therefore, the number of the packet identification units to be connected in parallel can be determined according to the amount of reference data, which facilitate construction of a packet identification device according to an intended operation of the device. Furthermore, since the number of the packet identification units for carrying out parallel processing can be increased in accordance with an increase in the amount of reference data as described above, it is possible to perform comparison of each packet with a large amount of reference data without increasing time required for packet identification.

Although in the above-described example, the data length for each comparison operation is set to 8 bits, this is not limitative, but a unit comparison circuit capable of performing 4-bit or 16-bit comparison may be employed.

It should be noted that when the unit of data length for each comparison operation is changed, timing in which a data acquisition signal is generated and a method of registering reference data need be modified as deemed appropriate.

Further, when it is desired not only to detect a match of an IP address, a port number, or the like, but also to specify a range of the same by designating an upper limit value and a lower limit value and determine whether comparison data is within the range, instead of the above-described method of repeatedly comparing unit data having a predetermined data length, there can be envisaged the following method: Let it be assumed, for example, that the unit data length is set to 4 bits, and a range of a port number (bit width: 16 bits) is desired to be designated using upper and lower limit values. In this case, four pieces of comparison data (4 bits) corresponding to a port number and four pieces of reference data corresponding to each of the upper limit value and the lower limit value are stored in a unit comparison circuit, and 4-bit comparison is performed by the unit comparison circuit.

Furthermore, although in the unit comparison circuit, some IP addresses are excluded from comparison e.g. by using a subnet mask as described hereinbefore, the same method can be used for excluding some of various comparison data of the other attributes.

Moreover, it is possible to expand the function of the unit comparison circuit such that it can output not only the match signal but also information on which reference data the comparison data matches or various kinds of information related to the match, and this variation is also within the scope of the present invention.

Further, when comparison data matches a plurality of registered data, it is possible to give priority to one of the registered data according to a condition, such as a position in the sequence of registration numbers, and this variation is also within the scope of the present invention.

Furthermore, in the present example, it is assumed that a plurality of reference data registered in the lookup table cannot match comparison data simultaneously, but when it can be expected that a plurality of matches can occur simultaneously (e.g. in packet filtering), it is possible to provide a function for giving priority to the plurality of reference data matching the comparison data in increasing order of registration numbers. This variation is also within the scope of the present invention.

A configuration can also be employed in which in registering data in the lookup table, necessary data is not written at a time, but in a plurality of separate operations. In this case, for example, if data to be registered is 128-bit data, the unit data length is set to 4 bits, and 4-bit unit data are written into the lookup table in 32 cycles. This makes it possible to reduce the number of pins in the packet identification device, which is useful in installation of the present device.

As described above, according to the present invention, reference data is stored in a state divided into a plurality of unit data, and a plurality of unit data associated with the attribute of comparison data are compared with the comparison data. Therefore, comparison circuits is only required to be capable of performing data comparison according to the data length of unit data, which contributes to reduction of the size of an entire circuit that executes high-speed packet identification.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A packet identification device for identifying contents of an input packet, comprising:
   a lookup table that stores a plurality of reference data each divided into unit data associated with respective attributes, in a distributed manner in respective storage areas having addresses defined on an attribute-by-attribute basis, and is operable when a reading address is input, to output a plurality of unit data associated with one of the attributes corresponding to the reading address;
   an analysis circuit that analyzes an attribute of a comparison data item in the input packet;
   an address control circuit that outputs an address corresponding to the attribute of the comparison data item analyzed by said analysis circuit to said lookup table, as the reading address; and
   a plurality of unit comparison circuits provided in association with the plurality of reference data, respectively, for each performing comparison between an associated one of the plurality of unit data output from said lookup table and the comparison data item analyzed by said analysis circuit,
   wherein:
   when all of comparison data items extracted from the packet match respective unit data of same attributes in the reference data, said unit comparison circuit determines that there is a match between the reference data associated therewith and the packet,
   said lookup table stores the reference data including comparison result data to be output as the result of comparison,
   said address control circuit outputs an address of a storage area storing the comparison result data to said lookup table after completion of comparison of all of the comparison data items in the packet, and
   said unit comparison circuit outputs the comparison result data delivered from said lookup table, as the result of comparison, when there is a match between the reference data associated with said unit comparison circuit and the packet.

2. The packet identification device according to claim 1, wherein said lockup table stores, as the comparison result data, identification information that uniquely identifies a secret key for use in encryption/decryption.

3. The packet identification device according to claim 1, wherein said analysis circuit determines attributes of data items in the packet based on header information contained in the packet.

4. The packet identification device according to claim 1, wherein said unit comparison circuits exclude some of the comparison data items from comparison based on mask information set therefor.

5. A packet identification device for identifying contents of an input packet, comprising:
   a lookup table that stores a plurality of reference data each divided into unit data associated with respective attributes, in a distributed manner in respective storage areas having addresses defined on an attribute-by-attribute basis, and is operable when a reading address is input, to output a plurality of unit data associated with one of the attributes corresponding to the reading address;
   an analysis circuit that analyzes an attribute of a comparison data item in the input packet;
   an address control circuit that outputs an address corresponding to the attribute of the comparison data item analyzed by said analysis circuit to said lookup table, as the reading address; and
   a plurality of unit comparison circuits provided in association with the plurality of reference data, respectively, for each performing comparison between an associated one of the plurality of unit data output from said lookup table and the comparison data item analyzed by said analysis circuit,
   wherein said lookup table stores the reference data including comparison condition data indicative of a comparison condition, and
   wherein when said analysis circuit receives the comparison data item of a predetermined attribute, said analysis circuit outputs a comparison condition-setting signal associated with the predetermined attribute, and then outputs a comparison execution signal for execution of comparison of the comparison data item, and
   wherein said address control circuit outputs the reading address corresponding to the comparison condition data in response to the comparison condition-setting signal, and outputs the reading address corresponding to the predetermined attribute in response to the comparison execution signal, and
   wherein said unit comparison circuits perform, according to the comparison condition data delivered from said lookup table, comparison between the comparison data item received after the comparison condition data, and the unit data.

6. The packet identification device according to claim 5, wherein said unit comparison circuits determine, based on the comparison condition data, whether or not comparison between the comparison data item and the unit data is necessary.

7. The packet identification device according to claim 5, wherein when said analysis circuit outputs the comparison condition-setting signal, said analysis circuit delays supply of the following comparison data item to said unit comparison circuits.

8. The packet identification device according to claim 7, wherein said analysis circuit delays the supply of the comparison data item only when the comparison data item is continuously input.

9. A packet identification device for identifying contents of an input packet, comprising:
   a plurality of packet identification units connected in parallel with each other,
   each of said packet identification units comprising:
   a lookup table that stores a plurality of reference data each divided into unit data associated with respective attributes, in a distributed manner in respective storage areas having addresses defined on an attribute-by-attribute basis, and is operable when a reading address is input, to output a plurality of unit data associated with one of the attributes corresponding to the reading address;

an analysis circuit that analyzes an attribute of a comparison data item in the input packet;

an address control circuit that outputs an address corresponding to the attribute of the comparison data item analyzed by said analysis circuit to said lookup table, as the reading address; and a plurality of unit comparison circuits provided in association with the plurality of reference data, respectively, for each performing comparison between an associated one of the plurality of unit data output from said lookup table and the comparison data item analyzed by said analysis circuit, wherein:

when all of comparison data items extracted from the packet match respective unit data of same attributes in the reference data, said unit comparison circuit determines that there is a match between the reference data associated therewith and the packet, said lockup table stores the reference data including comparison result data to be output as the result of comparison, said address control circuit outputs an address of a storage area storing the comparison result data to said lockup table after completion of comparison of all of the comparison data items in the packet, and said unit comparison circuit outputs the comparison result data delivered from said lockup table, as the result of comparison, when there is a match between the reference data associated with said unit comparison circuit and the packet.

10. A method of identifying contents of an input packet, comprising:

storing, in advance, a plurality of reference data each divided into unit data associated with respective attributes, in a distributed manner in respective storage areas having addresses defined on an attribute-by-attribute basis;

analyzing an attribute of a comparison data item in the input packet;

fetching a plurality of the unit data from a storage area in the lookup table, the storage area being indicated by an address associated with the analyzed attribute of the comparison data item; and performing parallel comparison between the fetched unit data and the comparison data item using a plurality of unit comparison circuits, to thereby determine whether or not the comparison data item matches any of the fetched unit data, wherein:

when all of comparison data items extracted from the packet match respective unit data of same attributes in the reference data, said unit comparison circuit determines that there is a match between the reference data associated therewith and the packet, said lookup table stores the reference data including comparison result data to be output as the result of comparison, said address control circuit outputs an address of a storage area storing the comparison result data to said lookup table after completion of comparison of all of the comparison data items in the packet, and said unit comparison circuit outputs the comparison result data delivered from said lookup table, as the result of comparison, when there is a match between the reference data associated with said unit comparison circuit and the packet.

* * * * *

UNITED STATES PATENT AND TRADEMARK OFFICE
CERTIFICATE OF CORRECTION

PATENT NO. : 7,457,292 B2  Page 1 of 1
APPLICATION NO. : 11/082798
DATED : November 25, 2008
INVENTOR(S) : Kazuya Asano It is certified that error appears in the above-identified patent and that said Letters Patent is hereby corrected as shown below:

Claim 2, Col. 21, line 57, change "lockup" to --lookup--.

Claim 5, Col. 22, line 23, change "lockup" to --lookup--.

Claim 9, Col. 23, line 25, change "lockup" to --lookup--.

Claim 9, Col. 23, line 30, change "lockup" to --lookup--.

Claim 9, Col. 23, line (approx) 34, change "lockup" to --lookup--.

Signed and Sealed this

Tenth Day of February, 2009

JOHN DOLL
*Acting Director of the United States Patent and Trademark Office*